United States Patent
Shefet et al.

(10) Patent No.: US 6,713,107 B2
(45) Date of Patent: Mar. 30, 2004

(54) AIRFLOW DISTRIBUTION SYSTEMS FOR FOOD PROCESSORS

(75) Inventors: Sarid Shefet, Cary, NC (US); Fabian Huschka, Winnenden (DE); Lawrence Alan Chandler, Raleigh, NC (US); Ulrich Fessmann, Winnenden (DE); André Boudewijns, Helmond (NL); Richard Rodeheaver Hawkins, Raleigh, NC (US)

(73) Assignees: ConAgra Foods, Inc., Edina, MN (US); Wilhelm Fessmann GmbH U. Co., Winnenden (DE)

( * ) Notice: Subject to any disclaimer, the term of this patent is extended or adjusted under 35 U.S.C. 154(b) by 52 days.

(21) Appl. No.: 10/087,548

(22) Filed: Mar. 1, 2002

(65) Prior Publication Data

US 2003/0165600 A1 Sep. 4, 2003

(51) Int. Cl.$^7$ .............................. A23L 1/31; F24C 15/32; F27B 9/00
(52) U.S. Cl. ............................ 426/315; 34/207; 99/355; 99/386; 99/443 C; 99/479; 126/21 R; 126/21 A; 426/465; 426/521; 426/524; 432/133
(58) Field of Search ................................. 426/231, 465, 426/521, 524, 646, 315, 513, 520, 523; 99/355, 386, 443 C, 470, 479, 473, 477, 478; 126/21 R, 21 A; 34/207, 1; 432/133

(56) References Cited

U.S. PATENT DOCUMENTS

| | | | |
|---|---|---|---|
| 4,079,666 A | 3/1978 | Plemons et al. | 99/355 |
| 4,565,282 A | 1/1986 | Olsson et al. | 198/778 |

(List continued on next page.)

FOREIGN PATENT DOCUMENTS

FR    2.088.622    4/1970

OTHER PUBLICATIONS

U.S. patent application Ser. No. 09/888,925, Shefet, filed Jun. 25, 2001.

(List continued on next page.)

Primary Examiner—George C. Yeung
(74) Attorney, Agent, or Firm—Myers Bigel Sibley & Sajovec, PA

(57) ABSTRACT

Gas and/or air distribution systems and methods for distributing thermally and/or otherwise treated gas in a food processor by moving at least one food item over a predetermined travel path in a food processor having a food travel path comprising a moving floor and upwardly extending first and second sidewalls located on opposing sides thereof, the travel path having a corresponding first and second side portions. The methods include: (a) moving at least one food item over a predetermined travel path in a food processor having a food travel pathway comprising a moving floor and upwardly extending first and second sidewalls located on opposing sides thereof, the travel pathway having corresponding first and second side portions; (b) introducing exogenous fluid into the food processor from a plurality of inlet ports positioned proximate the first side portion of the travel pathway during the moving step to thereby treat the food; (c) exhausting fluid from the food processor from a plurality of exhaust ports positioned proximate the second side portion of the travel pathway; and (d) directing the exogenous fluid to travel from the first side portion to the second side portion over the food held on the food travel pathway during the moving step. The distribution system may be particularly suitable for processing systems employing vertically stacked tiers and/or moving floors that advance or move the food during the processing exposure (such as heating, cooling, curing, smoking, and the like).

70 Claims, 15 Drawing Sheets

U.S. PATENT DOCUMENTS

| | | | | |
|---|---|---|---|---|
| 4,726,766 | A | * 2/1988 | Stewart et al. | 99/443 C |
| 4,890,394 | A | * 1/1990 | Troetscher | 34/1 |
| 4,997,365 | A | 3/1991 | Lanham | 432/121 |
| 5,078,120 | A | 1/1992 | Hwang | 126/369 |
| 5,277,301 | A | 1/1994 | Fenty | 198/778 |
| RE35,259 | E | 6/1996 | Williams | 126/369 |
| 5,843,504 | A | * 12/1998 | Kobussen et al. | 426/513 |
| 5,942,265 | A | 8/1999 | Roberds et al. | 426/59 |

OTHER PUBLICATIONS

Article, "Continuous Process Systems", Alkar, http:www.alkar.com (date unavailable; believed to be dated before Mar. 1, 2002) pp. 1–3.

Article, "Batch Ovens", Alkar, http://www.alkar.com (date unavailable; believed to be dated before Mar. 1, 2002) pp. 1–3.

Brochure, "Fessmann Turbomat 7000: Industrial Smoking and Cooking", Fessman Group (date unavailable; believed to be dated before Mar. 1, 2002) pp. 1–8.

Brochure, "Fessmann Smoking Cooking Cooling", Fessman Group (date unavailable; believed to be dated before Mar. 1, 2002) pp. 1–8.

Brochure, "Fessmann Transfer 4000: Continuous Smoking, Cooking and Cooling", Fessman Group (date unavailable; believed to be dated before Mar. 1, 2002) pp. 1–9.

Pictures of the inside of a conventional prior art oven from Alkar.

* cited by examiner

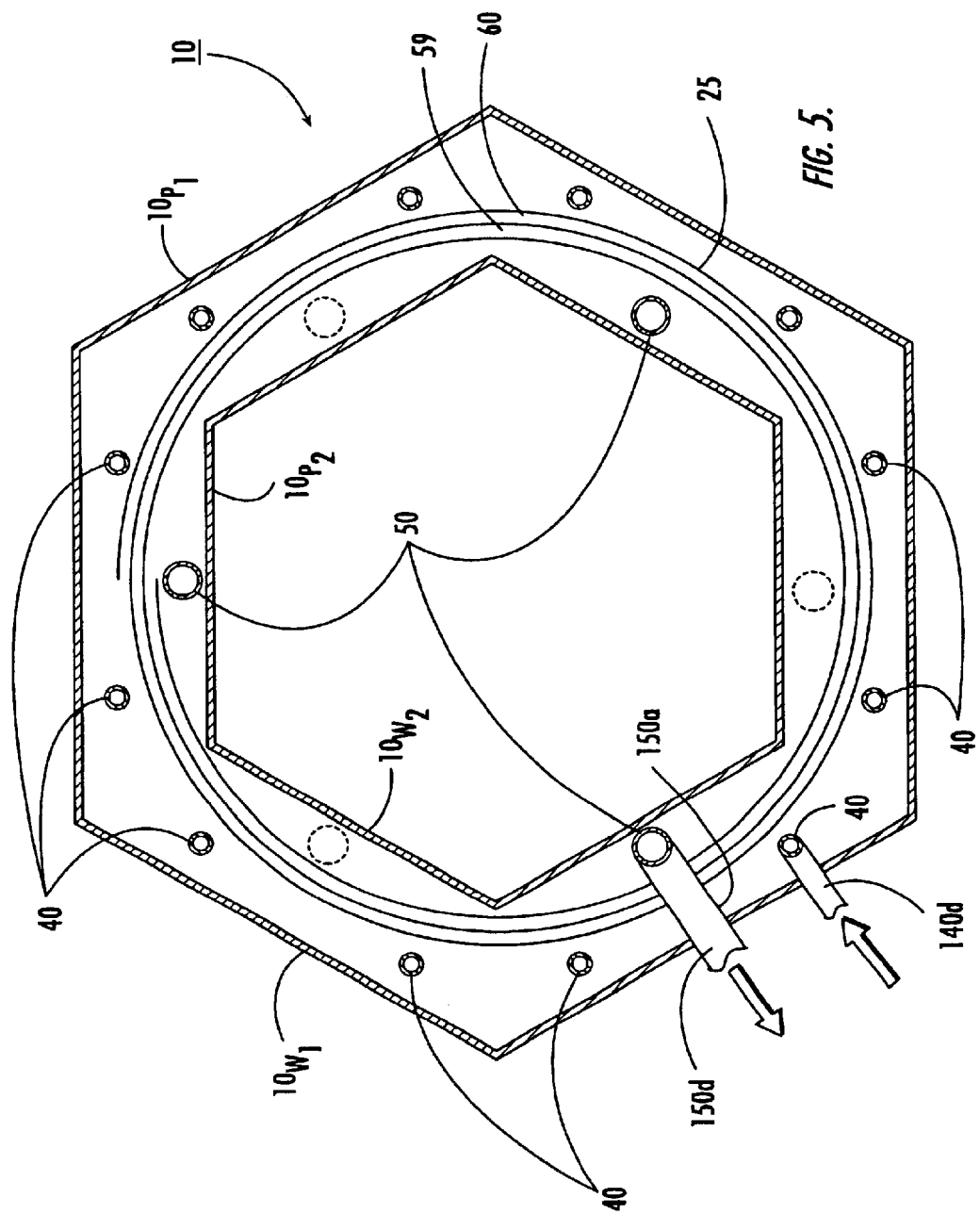

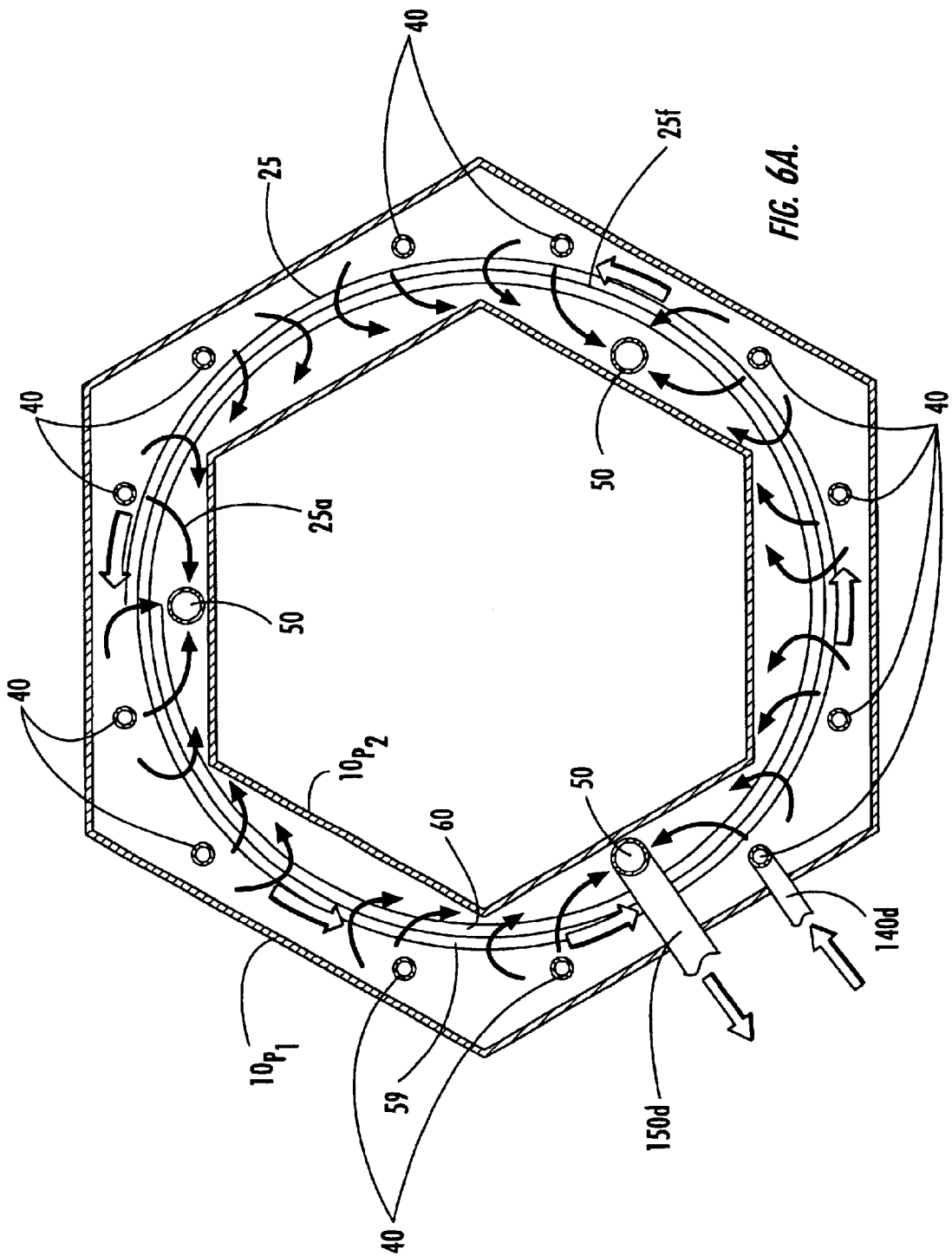

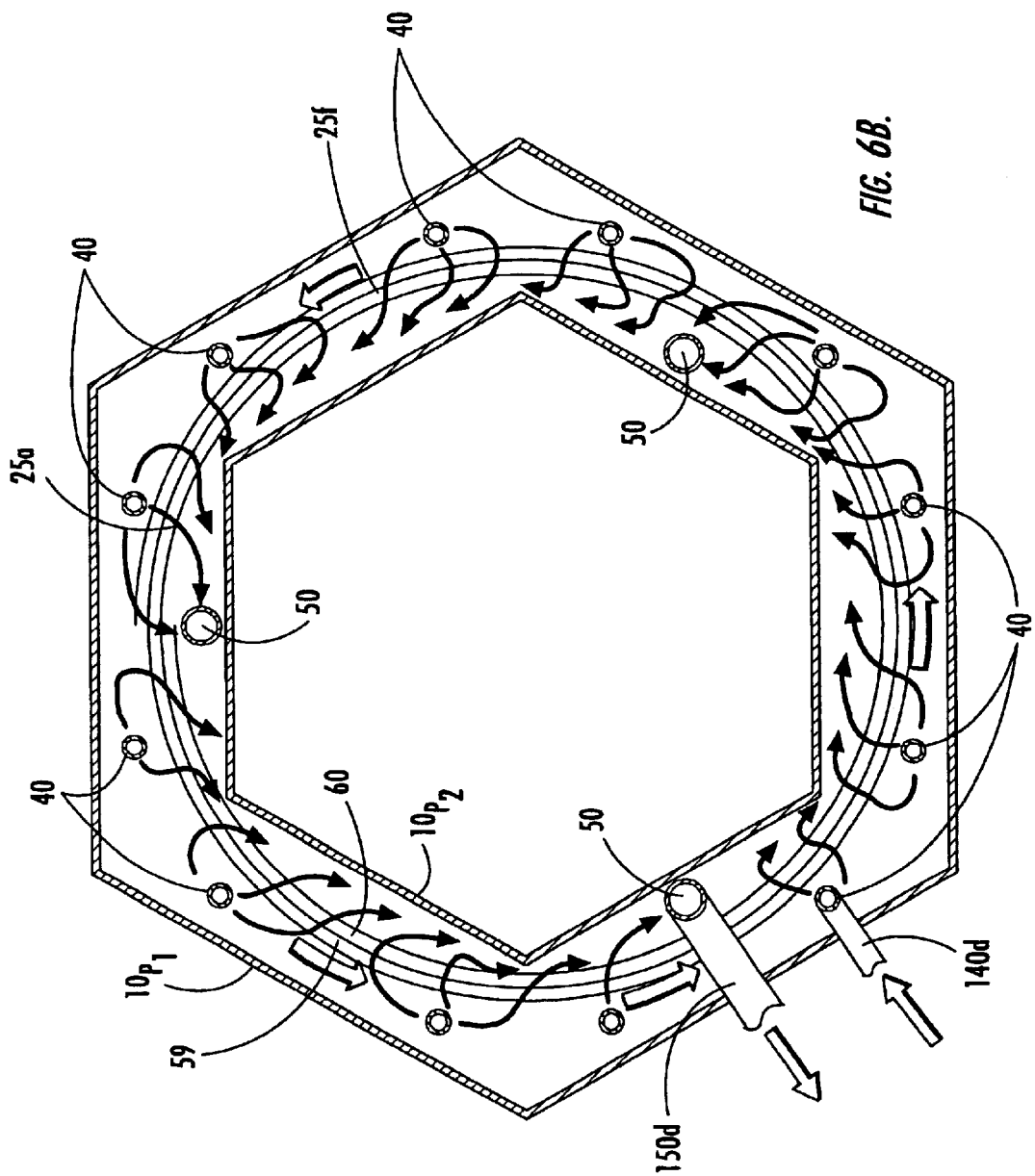

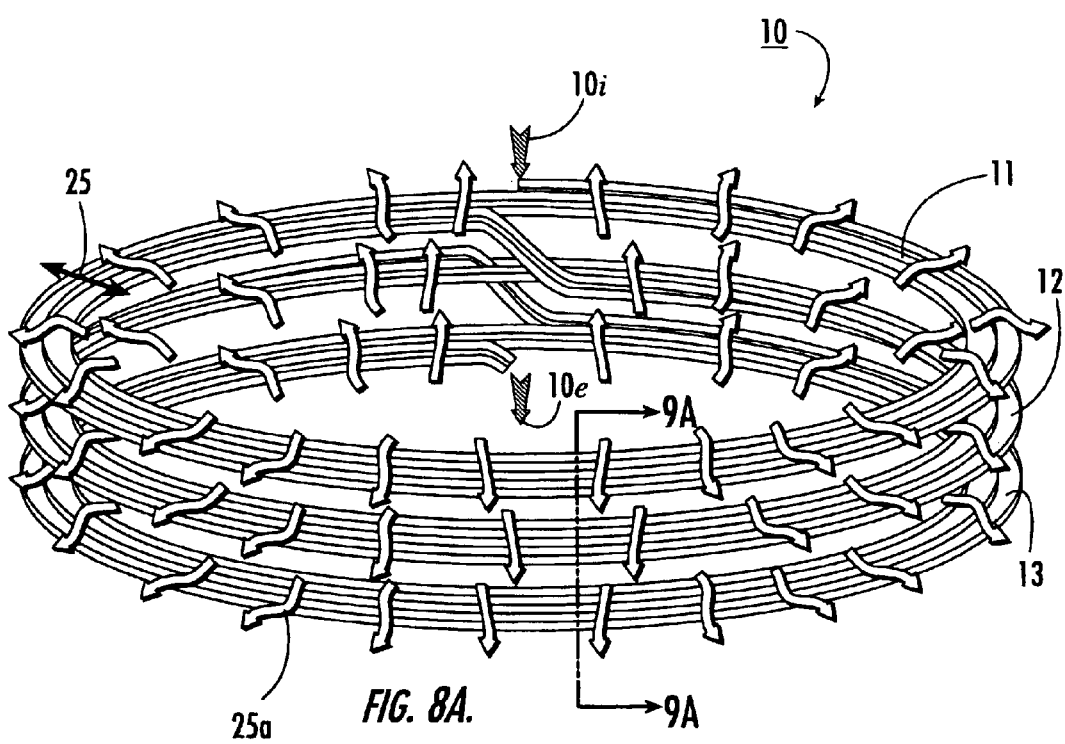

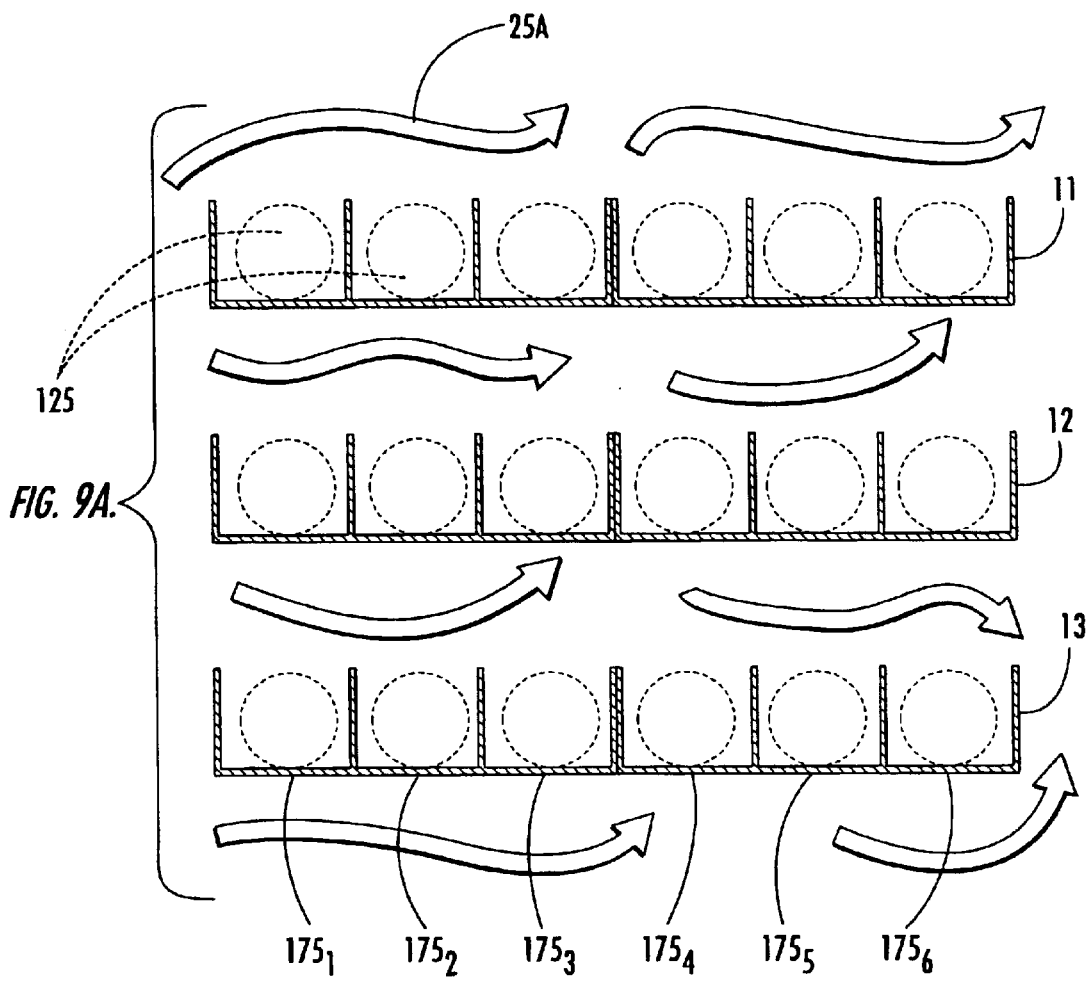

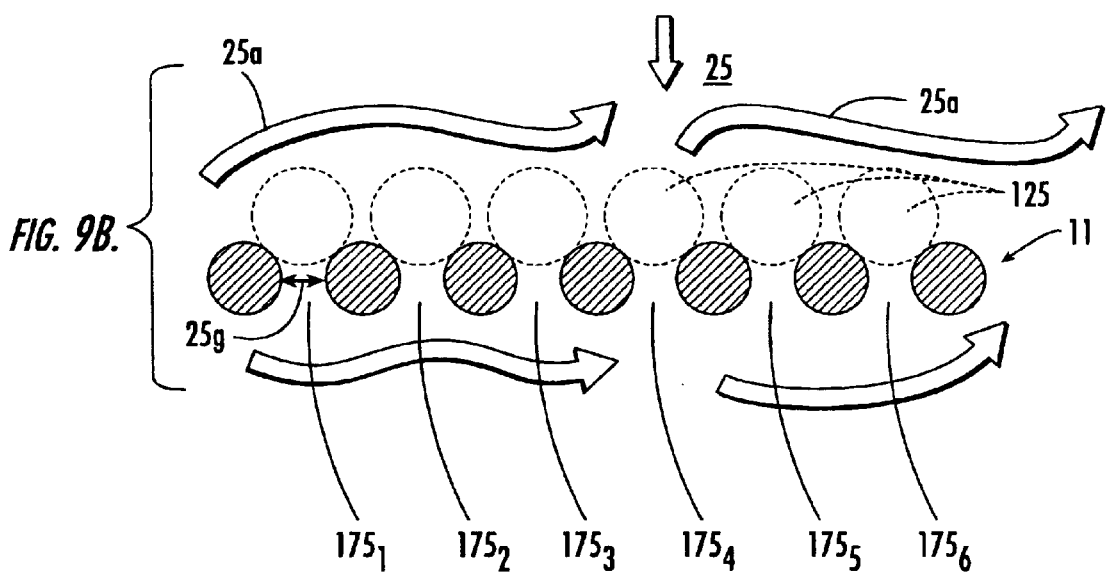

AIRFLOW DISTRIBUTION SYSTEMS FOR FOOD PROCESSORS

FIELD OF THE INVENTION

The present invention relates to forced airflow systems for food treatment facilities such as vertical rise dryers, smokers, curing chambers, ovens or warmers, coolers, and/or freezers.

BACKGROUND OF THE INVENTION

Conventionally, several different food treatment system configurations have been used to smoke, cure, dry, cook, cool, or freeze food products such as meat products so as to increase production capacity while attempting to limit the floor space required for carrying out same. In so doing, vertical rise systems have been used with spiral conveyors to move food vertically through the oven while exposing the food to certain processing conditions as it moves from top to bottom or bottom to top. Other systems employ tunnel or linear floor mounted systems that direct food through on trolleys or the like.

Examples of vertical systems include the Northfield LST (Large Spiral Technology) freezer available from Frigoscandia Equipment (fmcfoodtech.com) is a high capacity non-self stacking spiral freezer that employs spiral conveyors with belts available in different widths. Ryson International Inc. of Newport News, Va., provides spiral conveyors that are purported to feature a small footprint and space savings over other brands with load capacities of up to 200 fpm. Another example is the TURBO-Dryer® from Wyssmont (wyssmont.com). The TURBO-Dryer® uses a stack of slowly rotating circular trays. In operation, food is fed onto the top tray and, after one revolution, is wiped onto the next lower tray where the operation is repeated. The trays are enclosed in a vertical enclosure that circulates heated air or gas about the food on the trays. Each level in the enclosure may be held at a uniform temperature or the enclosure may be configured with zoned temperature regions having different temperatures. Yet another example is found in U.S. Pat. No. 5,942,265 that describes conveying pepperoni meat to a conventional spiral dryer that includes a number of tiers (typically about 38–42) according to the initial moisture level, the desired final moisture level, the relative humidity of the air, the total amount of water to be removed, the temperature, and the conveyor speed.

An example of a tunnel-like system, available from ALKAR located in Lodi, Wis., employs a plurality of serially connected in-line rooms or chambers with sidewalls and front and rear doors on opposing sides of the rooms that cooperably open and close to hold the food enclosed within each room for predetermined intervals of time as the food progresses forward on the trolleys through the series of rooms forming the tunnel. The walls may include a series of downwardly extending baffles that are aligned with baffles on the opposite wall.

The food is positioned on a trolley that is automatically moved serially horizontally forward through the tunnel and stopped in each chamber for a period of time so that the food on the trolley is exposed to the environmental conditions in the enclosed chamber. The trolley may include multiple batches, trays, or tiers of stacked food items. In operation, the trolley is suspended from rails and enters the open doors of one chamber and the front and rear doors of the chamber close with the trolley stopped therein, thereby defining a closed chamber. One or more trolleys rests in the closed chamber for a period of time during which the chamber is brought to its desired temperature and food can be exposed to heated air-flow. Subsequently, doors on the opposing side of the chamber open, and the trolley then re-initiates movement to pass through the open doorway and enter the next in the serial line of chambers or rooms. Each chamber or room may generate a different environmental condition. The trolley may be connected to a series of trolleys that move in unison through the various chambers.

When processing food through the various systems, the distribution of air or airflow about the food may influence the manner in which the food is cooked, cooled, or otherwise thermally and/or environmentally processed. Uneven distribution patterns may yield a non-uniformly processed product batch. This can be particularly problematic in large capacity continuous process ovens. Other airflow or air distribution patterns may increase the time it takes to reach the desired environmental condition or temperature and may be inefficient in its use of energy.

For example, in general, in the tunnel system, heated air may be directed to flow down from nozzles positioned on the ceiling, discharged at various vertical heights through baffles along one sidewall, and then collected to travel back up to exit in the opposing sidewall of the chamber or at a centrally located exit-air return, that may also be located about the top portion of the chamber. This airflow pattern forces air down about the food on the static trolley, the air rebounds off the walls and floor (and/or trolleys, trays, and screens) and travels back up through the food on the trolley to exit in the air-return. The airflow may be characterized as substantially laminar, potentially inhibiting uniform heat transfer and/or air distribution about the product on the trolley or trolleys. Unfortunately, fresh air may be unevenly distributed in the chamber; the product in the chamber may be non-uniformly exposed potentially leaving dead-spots and/or irregular degrees of exposure to heat and or moisture. This may yield a thermally inconsistent product at various locations thereof so that portions of the product may be overdone, underdone and/or inconsistently processed.

For continuously or substantially continuously moving product lines that move during the thermal treatment itself (such as those employing moving or conveying floors), uniform air distribution may also be problematic in that the moving floors may create physical or air wall blockage or turbulence that can also inhibit the uniform exposure or create undesirable temperature gradients in the system (such as an oven). For example, in round and/or vertical stacked tier ovens or systems that employ substantially circularly configured moving floors, a centrifugal force may be generated that may undesirably force the heated or desired environmental air to the outermost wall of the oven causing a potential large and inefficient temperature gradient at certain zones or regions in one or more tiers or levels of the oven.

In view of the foregoing, there remains a need to provide alternative airflow distribution systems for food processors.

SUMMARY OF THE INVENTION

The present invention provides forced fluid flow distribution systems that can direct exogenously introduced fluid (typically primarily a gas or gas mixture such as air) to flow in a flow path that directs the fluid across food held on a food track having an associated width. As such, the flow includes a lateral directional component and may also include a vertical component.

Certain embodiments are directed to operations for treating food traveling through a food processor. Such embodiments include: (a) moving at least one food item over a predetermined travel path in a food processor having a food travel pathway comprising a moving floor and upwardly extending first and second sidewalls located on opposing sides thereof, the travel pathway having corresponding first and second side portions; (b) introducing exogenous fluid into the food processor from a plurality of inlet ports positioned proximate the first sidewall during the moving step to thereby thermally treat the food; (c) exhausting the fluid from the food processor from a plurality of exhaust ports positioned proximate the second sidewall; and (d) directing the exogenous fluid from the introducing step to travel from the first side portion to the second side portion over the food held on the food travel pathway.

The treatment can comprise a thermal treatment (heating and/or cooling), smoking, chemical, radiation, light, and the like. In certain particular embodiments, the food processor includes a plurality of vertically stacked tiers each having a portion of the food travel path thereon, the vertically stacked tiers being longitudinally spaced apart a desired distance. In such embodiments moving the food item can be provided by (substantially continuously) advancing the food to travel successively over a plurality of the different tiers.

Other embodiments are directed at food processing apparatus with forced fluid distribution systems. The apparatus includes: (a) a housing defining an enclosure and having a food inlet and a food outlet; (b) a plurality of stacked tiers residing in the housing, one or more tiers defining a treatment zone within the food processing apparatus, each of the tiers comprising a moving floor that moves the food along its desired travel path over a primary surface of a respective tier; and (c) a forced fluid distribution system in fluid communication with the stacked tiers. The forced fluid distribution system includes: (a) a first plurality of inlet ports positioned on a first side of the food travel path proximate each tier; (b) a second plurality of exhaust ports positioned on a second side of the food travel path across from the plurality of inlet ports proximate each tier; and (c) an exogenous supply of treated fluid operably associated with the inlet ports. In operation, the treated fluid (which can comprise thermally treated air or gas) flows over the food, in selected tiers, as the food is substantially moving through a treatment zone.

The food can be positioned on a floor that includes one or a plurality of side-by-side lanes. The floor can be configured to substantially continue move the food along its travel path during the desired treatment(s) in the processor.

In particular embodiments, the second plurality of exhaust ports are fewer in number than the first plurality of inlet ports and the exhaust ports are configured so that they have a cumulative cross-sectional area that is greater than that of the cumulative cross-sectional area of the inlet ports. In other embodiments, the forced distribution system further includes a pressure relief valve that is configured to release fluid from the food processor upon the detection of elevated pressure levels. The exhaust ports may be also be configured so that they present a cumulative cross-sectional area that is less than that of the cumulative cross-sectional area of the inlet ports.

In particular embodiments, treated gas or air is introduced into an enclosure that has an outer perimeter wall and an inner perimeter wall. The gas/air is introduced into the enclosure from a common wall (either the outer or the inner) and forced to travel across the width of the enclosure to exit from the opposing common wall (i.e., either the inner or the outer, respectively) so that the air travels across the distance of the enclosure between the opposing walls. Ducts may be used so that the physical intake and exit primary channels are disposed together about a single wall or side to reduce the amount of floor space needed to support the air distribution structure. The gas/air may be untreated or treated (thermally, chemically, and the like).

In other embodiments, the present invention provides a forced distribution configuration that is able to provide a predetermined thermal gradient that is substantially constant across a lane or lanes holding food product and/or that inhibits an undue gradient at the edges of one side the enclosure, that may be particularly suitable for vertically stacked tiers having multiple zones or tiers that are held within the enclosure.

In certain embodiments, the enclosure encases a plurality of stacked tiers that each defines at least a portion of a product flow path. At each tier, the product travel path can include a moving floor that is defined by one or more conveyors. The fluid flow system can include a plurality of spaced apart inlet ports that are positioned on a first side of the product travel path and a plurality of spaced apart outlet ports that are positioned on a second opposing side of the product travel path. The distributed fluid can be directed to move over the product on the floor of the travel path, even as the food is advanced during the treatment processing potentially introducing complex air-patterns generated by the moving floors.

In certain embodiments, the fluid distribution system distributes air and may be configured so that the number of inlet ports is greater than or equal to the number of outlet ports. The cumulative cross-sectional area of the inlet ports may be configured in size and/or shape so as to be substantially equal to and/or less than the cumulative cross-sectional area of the outlet ports thereby providing an equilibrated or decreased internal pressure that may promote a vacuum. In other embodiments, the cumulative cross-sectional area of the inlet ports can be greater than that of the outlet ports and the outlet ports can be operably associated with an over pressure relief valve that periodically discharges pressure when a certain level is detected or that substantially continuously discharges air to maintain pressure at a desired level.

In certain embodiments, cooperating side-by-side conveyors on each tier can be configured (such as pairs or more of continuously circulating conveyor belts) so that the food travels first on a first conveyor belt and then moves to an adjacent belt as the food travels greater than one revolution (and typically at least about 1.25–2 revolutions) about a majority of the tiers or levels. In other embodiments, the same conveyor can be used to provide the more than one revolution in each tier (diverting the food into different tracks within the same conveyor) or looping the conveyor to define a greater than one revolution travel path. In certain embodiments, the food item can be physically diverted, dropped, or elevated to a next adjacent underlying or overlying tier for further processing. The food item can be a meat product, and in particular embodiments, may be an elongated meat product (such as a substantially continuous length of linked, crimped, twisted or strand of food product). In other embodiments, the product can be a discrete length of meat product.

Certain embodiments of the invention include methods and systems for directing food through a multi-tier food processor that may be configured as an oven, an incubator, a chiller, a cooler, a dryer or combinations thereof. At least one food item is conveyed over a predetermined travel path in a food processor having a plurality of overlying or underlying tiers which are longitudinally spaced such that the at least one food item travels greater than one revolution in a first tier before it moves to the next tier (which may be aligned or misaligned with the adjacent tier(s) as desired). As the food travels in the travel path thermally treated gas (or gas mixtures that may include air) is forced over the food to treat the food in a predetermined manner. The gas may be heated, cooled, smoked, and/or moisturized or otherwise treated.

In certain embodiments, ducts, tubing, or pipes can be used to position the desired inlet and/or outlet ports at various vertical spaced locations in the enclosure or processing system.

Still other embodiments are directed to nested food processing apparatus. As such, the apparatus includes: (a) an outer processor having spaced apart inner and outer walls defining an enclosure therebetween and a food inlet and food outlet; and (b) an inner processor defining an enclosure having associated upwardly extending sidewalls and a food inlet and a food outlet, wherein the outer processor is configured to receive and surround the inner processor. Each of the inner and outer processors are configured to provide separately regulated operating environments. The outer and inner processors may include: (a) a plurality of vertically stacked tiers held within the enclosure; (b) at least one conveyor operably associated with each tier, the at least one conveyor being configured to move a food item about the tier such that the food item travels greater than one revolution in each tier; (c) transfer means operably associated with the tiers for directing the food to travel to the next selected tier; and (d) a gas flow distribution system. The gas distribution system may include: (a) an exogenous supply of gas (which may be thermally treated and/or comprise particulate matter in particular embodiments); (b) a first plurality of spaced apart inlet ports positioned in the processing apparatus proximate to each tier about a selected one of the inner or outer walls in fluid communication with the exogenous supply of gas; (c) a second plurality of spaced apart exhaust ports positioned in the processing apparatus proximate to each tier about a different one of the walls selected to locate the inlet ports, wherein the second plurality is less than the first plurality to thereby provide fewer exhaust ports. The gas distribution system may be configured to continuously distribute gas while food is moving through each tier.

Each of the inner and outer processors can comprise portions that are ovens and/or can be configured to provide separate temperature regulated (and/or moisture or humidity, air velocity, cooling, heating, sprinkling, gas, and the like) spaces. The outer and inner ovens can include a plurality of stacked tiers held within the respective enclosures and one conveyor and/or a plurality of cooperating conveyors operably associated with each tier. The conveyor and/or cooperating conveyors can be configured to move the at least one food item serially over a major portion of the travel path to thereby provide more than one revolution in each tier. The processors can also include transfer means for directing the food to travel to the next selected (typically the adjacent) tier. The gas flow system may be configured to distribute thermally treated air such that air is forced to travel over the primary surfaces of the conveyors so as to reduce the thermal gradient thereacross, provide a suitable air mass mixture, and/or reduce undesired thermal clustering in the apparatus (hot or cold spots) to provide a processor with increased thermal efficiency.

Still other embodiments are directed to food processing systems having at least one food processing chamber with a plurality of stacked tiers for treating food. The systems include: (a) means for moving food through a food processing chamber having a plurality of stacked tiers, as the food is held on a food support surface; (b) means for directing exogenous gas to flow across food held on the food support surface held inside the food processing chamber while the food is moved in the chamber; and (c) means for exhausting gas comprising the exogenous air from the chamber while the food is moved in the chamber.

The foregoing and other objects and aspects of the present invention are explained in detail in the specification set forth below.

BRIEF DESCRIPTION OF THE DRAWINGS

FIG. 5 is a cutaway top view of a tier of a food processor according to embodiments of the present invention.

FIG. 6A illustrates the view shown in FIG. 5 with an exemplary forced gas distribution pattern according to embodiments of the present invention.

FIG. 6B illustrates the view shown in FIG. 5 with an alternate exemplary gas distribution pattern according to embodiments of the present invention.

FIG. 8A is a schematic perspective view of a multiple vertically stacked tier configuration with an exemplary forced gas and/or air distribution pattern according to embodiments of the present invention.

FIG. 9A is a side sectional view taken along lines 9A—9A drawn in FIGS. 8A, 8B illustrating forced gas flow over multiple lanes of food product held on a multi-lane travel track configuration according to embodiments of the present invention (the arrows corresponding to the configuration shown in FIG. 8A).

FIG. 9B is a side sectional view of an alternate embodiment of a multi-lane travel track according to the present invention.

DESCRIPTION OF EMBODIMENTS OF THE INVENTION

Figure 1:
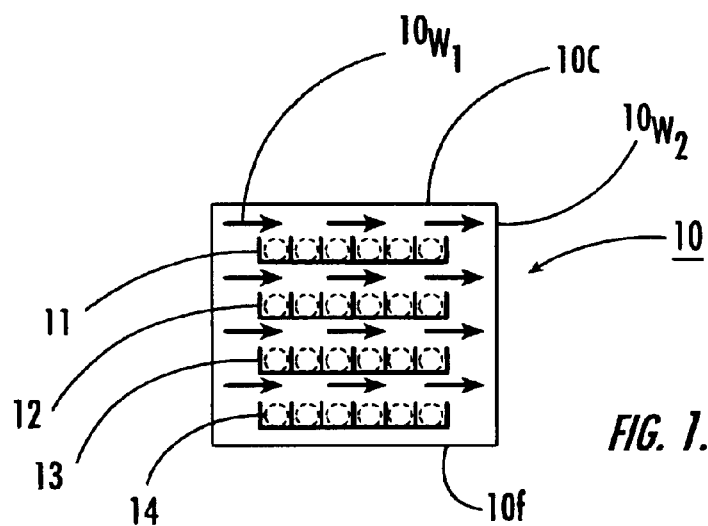
FIG. 1 is a schematic diagram of a multi-tier food processor according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity.

Generally described, the present invention is directed to food processor systems that are particularly suitable for large-scale mass production of food items. The food processor system can be configured as a vertical rise system and can include different zones exposed to different processing and/or food treatment conditions, such as one or more of a dryer, a heater, an incubator, an oven, a curing or smoking source, a cooler, chiller, refrigerator or freezer, a flavoring and/or chemical or ingredient additive or preservative unit, and the like. The system can employ fluids such as gases and gas mixtures that provide a desired treatment or environment within one or more regions in the processor system. The fluid can include one or more gases as its major and/or primary constituent(s). As such, the fluid can be formulated to comprise one or more of a gas, a gas and liquid, and/or gas, with liquid and/or particulate matter to perform and/or assist in the treatment carried out on the food. For example, at desired zones or at all zones, the system may use ambient and/or thermally treated air (either heated and/or cooled, as desired). Examples of other suitable gases include nitrogen, oxygen, and the like. The liquid may be aqueous based (such as brine), or other suitable food compatible substance. Each zone may include ceilings or floors to help maintain its desired environmental condition (which may open in a cooperating manner to exchange food therebetween as desired). Portions of zones and/or tiers may also be segmented and separated from the remainder of the same zone as will be discussed further below with respect to FIGS. 14A and 14B.

In certain embodiments, each or selected ones of tiers can include a food travel pathway defined by a moving floor including one or more conveyors. The food transport system may be configured to substantially continuously propel the food along its predetermined travel path about each tier so that the food travels while being thermally treated. In other embodiments, the food may be semi-continuously moved along its travel path (stopping at desired intervals therealong), but, typically, the product is continuously moved along its travel path during a major portion of the thermal processing (i.e., while thermally treated air is forced over the product).

The food processor can be configured to process solid or semi-solid food items or liquid items in containers or casings. Examples of food items include, but are not limited to, baked goods, candies, bakery (including dough and/or bread) products, dairy products, vegetables, snack or dessert items, and meat products. In certain embodiments, the food processing system and/or related devices may be particularly suitable to process discrete low profile items (substantially planar or flat objects), as well as elongated food items such as, but not limited to, elastic or partially elastic food items such as cheese (like mozzarella strands), dough (for incubation), meat sticks or strands, and the like.

In certain embodiments, the systems are configured to process discrete portions of a meat product and/or a length of an elongated product held in a casing. The casing can be any suitable casing (edible or inedible) such as a collagen casing. The elongated product can be an elongated meat product. Exemplary products include, but are not limited to, strands of meat such as pepperoni or beef, a processed meat product such as a pepperoni or beef stick, sausage, hotdog, or the like.

The elongated meat product can be configured as a contiguous or continuous length of product. The length may be selected so as to cover one or a plurality of lanes, tracks or perimeter paths over at least one tier or level. In certain embodiments, the length of product is contiguous or continuous so as to be able to extend over at least one revolution in a lane in a desired travel path. In certain embodiments, the elongated meat product has a length of at least about 20–25 feet, and may be, in particular embodiment at least about 50 feet. In other embodiments, the elongated meat product can have a length of between about 50–85 feet or more.

The processing system can be configured to substantially continuously move or automatically semi-continuously convey other items through a processing facility where enhanced capacity is desired. For example, a product processing system for medical products, pharmaceuticals where sterilization is desired or for implements, surgical tools or other items desiring sterilization, or manufacturing facilities for products undergoing curing, coating, brazing, tempering, sintering, or other processing condition. See co-pending U.S. patent application Ser. No. 09/888,925, filed Jun. 25, 2001 for descriptions of exemplary ovens and transport systems, the contents of which are hereby incorporated by reference as if recited in full herein. See also so-pending U.S. Provisional Application Serial No. 60/354,097, filed Feb. 4, 2002, identified by Attorney Docket No. 9281-3PR, and corresponding U.S. utility patent application Ser. No. 10/170,887 for description of exemplary food alignment and guiding mechanisms, the contents of which are also hereby incorporated by reference as if recited in full herein. See also, U.S. Pat. Nos. 4,582,047 and RE35,259, 5,942,265, 5,078,120, and 4,079,666, for descriptions of exemplary processing conditions for food and conveyor means, the contents of which are hereby incorporated by reference as if recited in full herein.

In certain particular embodiments, the present invention is used to move a strand, strands or lengths of elongated meat product. For example, strands of meat such as pepperoni or beef, a processed meat product such as a pepperoni or beef stick, sausage, or hotdog. The elongated food item may be elastic (at least in tension) so as to allow stretching without unduly altering or deforming its desired shape during processing. The elongated food item may be held in a natural or synthetic casing. In operation, the elongated meat product may have an exterior surface that exhibits increased friction relative to a finished, cured, or dried configuration. For example, a collagen casing can be described as having a relatively gelatinous sticky residue prior to its finished state that can cause the food to attempt to stick to a floor or support surface during transport and may make it difficult to route or guide this type of product in an automated relatively fast speed transport arrangement, particularly where non-linear or selectably changeable travel paths are desired.

Turning to FIG. 1, a vertical rise food processor 10 is shown with a plurality of longitudinally spaced tiers 11, 12, 13, 14 configured to provide a desired vertical height(s) within the processor and residence time in each tier (or, combined, the residence time in the food processor). Each tier 11, 12, 13, 14 may be configured to cooperate and form a portion of a cumulative food travel path, or to operate alone or with selective ones of the other tiers. The number of tiers employed can vary depending on the application and typically will include at least three and up to 60 or more. The food processor 10 includes an enclosure with two upwardly extending opposing sidewalls $10w_1$, $10w_2$, a ceiling $10c$ and floor $10f$. The enclosure is configured to provide an environmentally protected processing space.

As used herein, the term "vertically stacked" means that the tiers, shown as elements 11–14 in FIG. 1, are positioned as vertically or longitudinally spaced apart tiers, each tier (or a plurality of tiers) extending within a certain vertical region or zone of the processor. The vertically stacked tiers may be substantially vertically aligned (such as in a single column) as shown. Alternatively, one or more tier may be laterally offset relative to the other tiers. Each zone may have an independently controllable environment. The stacked tiers 11–14 may be arranged with substantially equal distances between adjacent ones of the tiers or with closer or further distances between adjacent tiers and/or combinations of same. The tiers may have planar floors or inclined (up or down floors) (not shown). Thus, although shown in FIG. 1 as a substantially planar tier surface, the travel path may be curvilinear or move vertically up and down a desired distance as it moves over each level in the tier. In certain embodiments, each tier defines a portion of the travel path in the processor 10 for the food item and can be any desired shape such as, but not limited to, circular, oval, rectangular, hourglass, or FIG. 8. The tiers 11–14 can be arranged such that each tier overlies or underlies the next adjacent tier in the travel path. The stacked tiers 11–14 may be offset or aligned as noted above.

The travel path is the path that the food travels within a particular tier as it travels in the food processor from the inlet to the outlet. In certain embodiments, each tier or zone (one or a plurality of selected tiers) as well as portions of each tier can be configured to have an individually controlled environment to provide the desired operating environments (to provide the desired physical treatments such as moisture or humidity (sprinkling), air velocity, gas exposure, temperature and the like).

Figure 2:
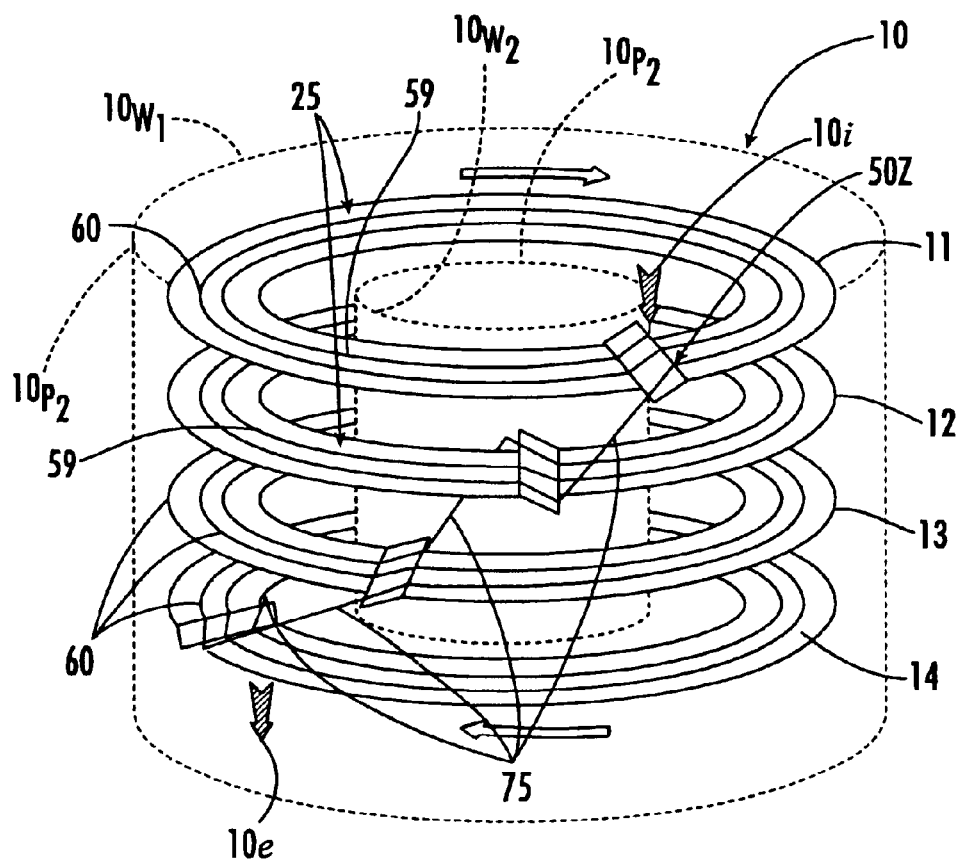
FIG. 2 is a perspective view of a stacked multi-tier processor according to embodiments of the present invention.

As noted above, the food processor 10 can be arranged such that selected or each tier is aligned or offset relative to the others, as desired. The height and diameter or width and length of the tiers within the processor 10 can vary, and typically is sized corresponding to the desired residence time in a food processor unit. FIG. 2 illustrates one embodiment of tiers 11, 12, 13, 14 where the tiers are substantially circular, that is, co-axially arranged with circular and substantially planar travel paths in each tier. However, other shapes of tiers and shapes and orientations of respective travel paths can also be employed. In the embodiment shown in FIG. 2, the opposing sidewalls $10w_1$, $10w_2$ (shown in broken line) are defined by an outer perimeter wall $10p_1$, and an inner perimeter wall $10p_2$. Although the inner and outer walls $10p_1$, $10p_2$ are shown as cylindrical walls, other configurations may also be employed. The food processor may include a food inlet port $10i$ that may be located at a top portion of the unit and a food outlet $10e$ that may be located a vertical distance downwardly therefrom (allowing the food to progress downwardly as it moves through the different treatment zones). In other embodiments, the inlet $10i$ can be at the bottom portion of the unit (not shown) and the food progress upwardly through the processor 10. In other embodiments, intermediate entry and exit locations can also be used (not shown). Furthermore, multiple inlets and exits may also be provided.

FIG. 2 also illustrates that in certain embodiments, each tier can have at least two serially arranged perimeter travel paths 59, 60 thereon. As shown, the two perimeter travel paths can be described as an innermost travel path 59 and outermost perimeter travel path 60. Of course, additional intermediate perimeter travel paths can also be disposed on one or more tier. The tiers 11–14 can be arranged so that, in operation, the food travels greater than one revolution on a single tier before the food item(s) travel to the next tier. In certain embodiments, the system is configured such that the food travels at least about 1.1–1.25, and typically about two or more revolutions, on a single tier (and in certain embodiments greater than one revolution on a plurality or all of the tiers within the processor).

It is also noted that in various figures (i.e., FIG. 1, FIGS. 9A, 12, and 13) the track 25 is illustrated as having a plurality of side-by-side channels (each with sidewalls). However, the track 25 may be otherwise configured; for example, but not limited thereto, the track 25 may include a single lane or a plurality of lanes, with the lanes not requiring sidewall guides therebetween, or a combination of lanes with and without the sidewalls.

In certain embodiments, the system can be configured such that the food moves more than one revolution on a single conveyor (i.e., the conveyor may be looped or have multiple tracks thereon so as to define more than one perimeter travel path on a particular tier) before moving to a second conveyor or the next tier. In other embodiments, a plurality of cooperating conveyors are used on each tier to define the perimeter paths, as will be discussed further below. Combinations of each of these conveyor configurations are also contemplated by certain embodiments of the present invention.

As shown in FIG. 2, the food is introduced at inlet 10e and is directed to move (or drop) down to a primary upper surface of the tier 11 to travel clockwise a first revolution about a food travel path 25 that can include a plurality of side-by-side lanes. In the embodiment shown, the travel path 25 includes a first perimeter path 59 and a second perimeter path 60. The food travels along the first perimeter path 59 until it reaches a transition or junction zone 50z where the food physically moves or transitions a lateral distance over to travel a second revolution (or portion thereof) on the second perimeter travel path 60. As such, the food item travels greater than one revolution on the first tier, and typically, at least about 1.1–1.25, and in certain embodiments, at least about 1.5 to about two or more revolutions, on two or more perimeter paths (shown as only two in FIG. 2), before it is directed to the next tier 12.

As is also shown in FIG. 2, in certain embodiments, after the food travels to approach the end of the second revolution, it approaches the transition zone with a transfer region 75 which disrupts the perimeter travel path 60 causing the food to enter the transfer region 75 and travel to the next adjacent tier 12 onto an adjacent (shown as underlying) perimeter travel path 60. This time, the outermost perimeter travel path 60 can be the first one the food follows on this tier 12. That is, the food may be forced to alter the sequence of travel on the perimeter paths 59, 60, tier to tier, so as to travel inner to outer and then outer to inner as it progresses down (or up) the tiers in the processor 10.

FIG. 2 also illustrates that the transfer regions 75 may be circumferentially spaced or offset on each tier level so that the food transfers only a desired distance to the next underlying adjacent tier. In addition, the transfer regions can be formed into alternating inner and outer travel paths 59 to 60 tier to tier. The transfer regions 75 may be defined as open spaces which allow the food to drop (via gravity) down to the next level or as shoots, conveyors or other transfer means.

Certain portions, or all of, the product support surface of the travel pathway 25 can be defined by moving floors that propel, advance, or move the food substantially continuously along its travel path to treat the product in the food processor 10. Each tier 11–14 can comprise one or more conveyors and/or moving floors (such as two or more side-by-side cooperating conveyors) to define the respective travel path. The conveyors can "cooperate" in that they can be configured to operate together to either hand off or receive food from the other conveyor so that the food serially travels first one then the other, as shown from either the inner perimeter path 59 to the outer 60, or vice versa. For circular, oval, elliptical, or other endless and/or continuously moving configurations, the moving floor(s) may generate complex air or gas flow patterns that attempt to force (such as via centrifugal forces) the internal volume of gas or air to approach the wall of the processor 10. Certain embodiments of the present invention are directed at providing fluid distribution systems and/or forced treated gas and/or gas mixture flow patterns that can provide sufficient thermal or desired treatment exposure to the products as they move through the processor.

Figure 3:
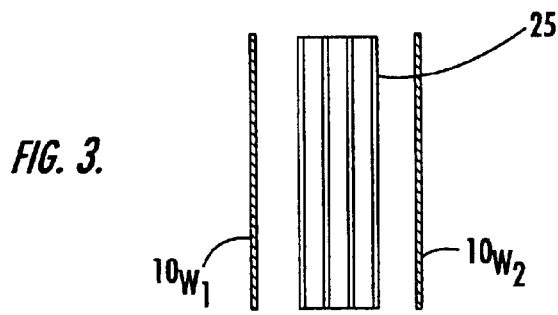
FIG. 3 is a schematic top view of a portion of a travel pathway or track (that may be defined by a moving floor where food product is located during operation) in a tier of a food processor showing the opposing sidewalls and the travel track positioned therebetween according to embodiments of the present invention.
Figure 4A:
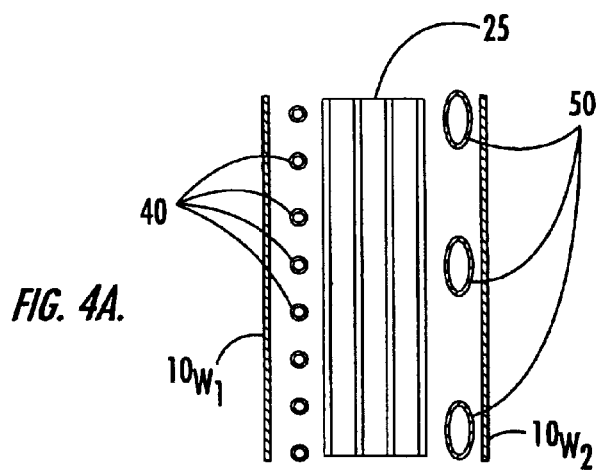
FIG. 4A illustrates the same view of the portion of the food processor shown in FIG. 3 with exemplary inlet ports disposed on one side of the track (shown as a greater number of the smaller sized ports) and exemplary exhaust ports disposed on the opposing side of the track (shown as the larger size ports in lesser numbers relative to the inlet ports) according to embodiments of the present invention.

FIG. 3 is a top view of a portion of a food travel path 25 held between sidewalls $10w_1$, $10w_2$ forming part of the enclosure or housing of a food processor 10 (shown without the ceiling or top portion for clarity). FIG. 4A illustrates one embodiment of an arrangement of inlet ports 40 and exhaust ports 50. The system is configured to distribute one or more desired fluid treatments to the food in the processor. The term "air" may be used instead of the term "fluid" for ease of description in certain places in the text. However, use of this term is not to be interpreted as limiting the fluid distributed by the system to air. The system can be configured to distribute either fluids and/or gases such as gas mixtures that comprise different gases, gas(es) mixed with liquid, aerosols, and/or solid particulates or powder. The fluid or gas mixtures may be in a natural or untreated form or may be physically or chemically treated, modified, or altered or otherwise processed. The gas or gas mixture can be moisturized or treated with chemicals as desired to treat the food as desired as is known to those of skill in the art.

In particular embodiments, the fluid that is used to administer the treatment in at least one zone in the processor is formulated to comprise gas, and typically, air, as a major constituent. The gas or air may be thermally treated (cooled or heated) as desired.

Figure 14A:
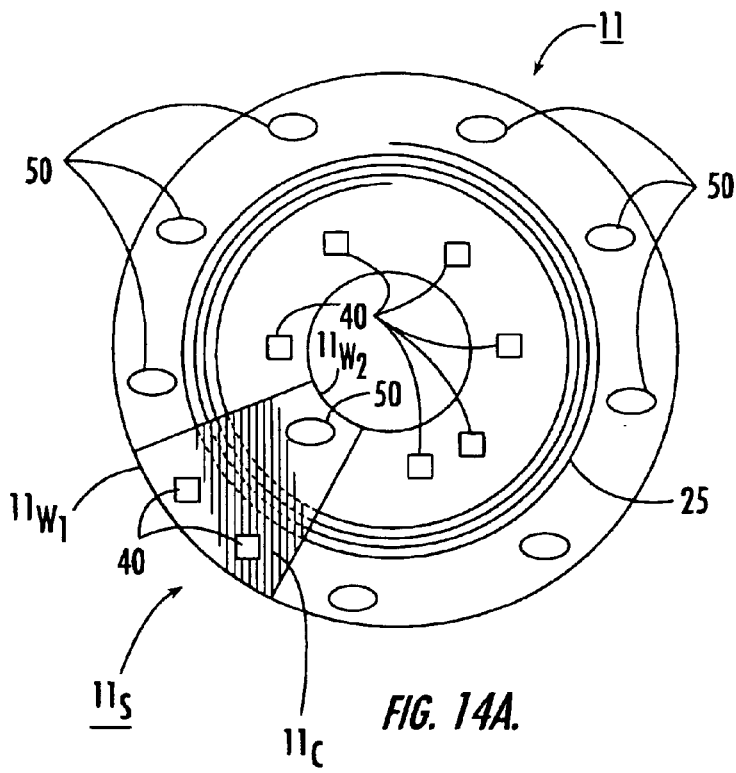
FIG. 14A is a top schematic view of a tier of a food processor that illustrates that the tier may be segmented and/or may position a reduced number of inlet and outlet ports on opposite sides of the track relative to the major portion of the respective inlet and outlet ports according to embodiments of the present invention.

As shown in FIG. 4A, the inlet ports 40 are arranged about a common side of the travel path 25 while the exhaust ports 50 are also arranged about a common side of the food path, across or opposing the side with the inlet ports 40. In the description, the inlet ports will be primarily positioned along one side of the track 25 with the exhaust ports on the other. However, as shown in FIG. 14A, in certain embodiments, a minor number of exhaust ports 50 may positioned on the same side as the inlet ports 40 (or vice versa) as the primary direction of fluid cross-flow is not destroyed by the inclusion of these ports.

For brevity of description, as the embodiments are described with respect to fluid (typically gas or gas mixture) distribution systems herein, it is noted that, for each embodiment, the reverse arrangement can be used: that is, the exhaust ports and inlet ports, primary and secondary ducts, or combinations of same can be reversed as to location with respect to the side of the processor or track in which it is shown.

In operation, the inlet ports are supplied with unprocessed or processed exogenous fluid, generally comprising a gas or gases as a major constituent thereof (introduced under pressure such as with a blower, compressor or the like). Typically, the gas comprises air that may be thermally processed air, either heated or cooled in at least some portion of the processor 10 from an external exogenous supply source. As such, the inlet ports 40 are in fluid communication with the exogenous supply source of fluid such as thermally treated air.

As shown in FIG. 4A, the inlet ports 40 may be spaced apart and be present about each or selected tiers 11–14 in a greater number than the number of exhaust ports 50. In addition, as shown, the exhaust ports 50 may have a larger cross-sectional area than that of the inlet ports 40. In certain embodiments, the cumulative cross-sectional area of the exhaust ports 50 can be substantially equal to or greater than the cumulative cross-sectional area of the inlet ports 40 while the number of inlet ports is greater than the number of exhaust ports 50. This can, in certain configurations, promote a decreased pressure (approaching a vacuum) condition within the enclosure or food processor housing.

Alternatively, the cumulative cross-sectional area of the inlet ports 40 can be greater than that of the exhaust ports 50. Such a system may create increased pressures in the enclosure of the processor 10. In certain embodiments, one or more pressure relief valves or bleed valves (not shown) can be used to automatically discharge air from the processor 10 when the presence of a certain pressure level is detected or reached. Such a pressure-relief system can help to maintain the pressure at a desired level in one or more zones or tiers.

Figure 4B:
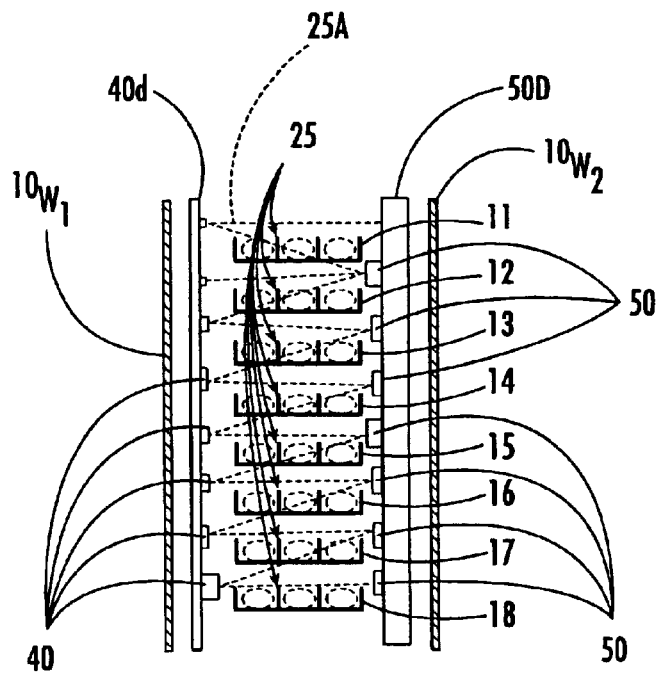
FIG. 4B illustrates a side view of a portion of the food processor illustrating that portion shown in FIG. 4A, with the intake portion is located on a first, left-hand side of the chamber and the exhaust located on the opposing, right-hand side of the chamber.

FIG. 4B illustrates that the processor 10 can include a primary inlet duct 40d and a primary exhaust duct 50d. In the embodiment shown in FIG. 4B, the primary inlet duct 40d is positioned on a different side of the food path 25 than the primary exhaust duct 50d. Other embodiments are shown in FIGS. 11A, 11B, 12A–12D, and 13A–13D and will be discussed further below.

Referring again to FIG. 4B, the primary exhaust duct 40d can be positioned so as to be proximate the first sidewall 10$w_1$ and/or intermediate the first sidewall 10$w_1$ and track 25. As shown, the duct 40d is positioned to the inside of the enclosure or wall 10$w_1$. In other embodiments, the duct 40d may be positioned on the outside of the enclosure wall 10$w_1$ and secondary ducts (140d, FIG. 5) with a laterally extending arm can be used to position the air inlet ports 40 where desired. If the latter, the secondary ducts can be sealed to the wall 10$w_1$ so as to inhibit air leakage at the junctions thereof. Similarly, the exhaust duct 50d can also be positioned within or externally of the wall 10$w_2$ or a secondary duct or ducts (150d, FIG. 5) with a laterally extending arm 150a can be used to directly discharge the exhaust into the environment external of the processor 10.

FIG. 4B illustrates that inlet ports 40 can be vertically located proximate each tier level 11–18 (and may also be horizontally spaced as shown in FIG. 4A). Similarly, exhaust ports 50 can be located proximate each tier level 11–18 (and may also be horizontally spaced as shown in FIG. 4A). An exemplary fluid or gas flow distribution pattern is shown by the broken lines extending between the inlet ports 40 and the exhaust ports 50. As shown, the fluid such as gas and/or air 25A moves across the product that is held on the track or path 25 at each level or tier. As is also shown by tiers 15–18, the inlet ports 40 may be substantially vertically aligned with one or more of the opposing exhaust port(s) 50. In other embodiments, the inlet ports 40 may be located at a different vertical height at a particular tier relative to the height of the exhaust port or ports (measured from the center of the port).

FIG. 4A illustrates that a number of aligned substantially equally spaced inlet ports 40 may be arranged about the first perimeter portion of the path or track 25 and a number of equally spaced aligned exhaust ports 50 (having greater spaced apart distances) may be arranged about the second opposing perimeter portion of the track 25. In certain embodiments, non-equally spaced and/or horizontally or laterally offset ports (inlet and/or exhaust 40, 50) may also be employed. Combinations of aligned and misaligned ports, either inlet 40 and/or exhaust 50 may also be used about a particular or selected tiers.

FIG. 5 illustrates a food processor 10 having a substantially circular track 25 for one or more tiers. As such, the opposing sidewalls 10$w_1$, 10$w_2$ are defined by the outer perimeter wall 10$p_1$ and the inner perimeter wall 10$p_2$. The inlet ports 40 are dispersed about the distance of the outermost perimeter portion of the track 25. In contrast, the exhaust ports 50 are positioned at discrete positions along the innermost perimeter portion of the track 25. Additional numbers of exhaust ports 50 can also be used as indicated by the broken line circles in FIG. 5. As shown, the track 25 can include two or more side-by-side lanes 59, 60 as desired. Further, as described above, primary ducts (40d, 50d, FIG. 4B) and/or secondary ducts 140d, 150d may be used to introduce or discharge the air from the processor 10.

FIG. 6A illustrates an exemplary distributed flow pattern 25a that may be generated by the arrangement of the distribution system. As shown, the fluid, gas and/or air travels from the inlet ports 40 positioned about the outermost portion of the track 25, over the track 25 (over the food on the track floor 25f during operation), and into the exhaust or discharge ports 50 while the track (i.e., the floor of the track) and food are moving (the moving floor is shown by the heavy line arrowheads overlaying the track 25).

Although shown as a contiguous floor 25f, in systems employing a plurality of stacked tiers, one or more of the tiers may comprise floors formed as segments or portions that are moving and portions that are stationary, and may employ one or more conveyors. In certain embodiments, the tiers are configured to substantially continuously move food along its desired travel path that may include multiple revolutions and/or multiple tiers during the thermal processing. The flow pattern may represent static conditions or conditions where the floor or product speed is small relative to the speed of the input and/or exhaust gas or air.

FIG. 6B illustrates an alternative flow pattern 25a where the speed of the moving floor 25f is such that the flow of the fluid is influenced so that the gas/air moves across the track 25 in an upstream direction and exits at a location that is forward of the inlet location when the floor 25f moves in a counterclockwise and/or forward direction. The reverse would be true where the floor 25f moves in a clockwise or reverse direction.

Figure 7:
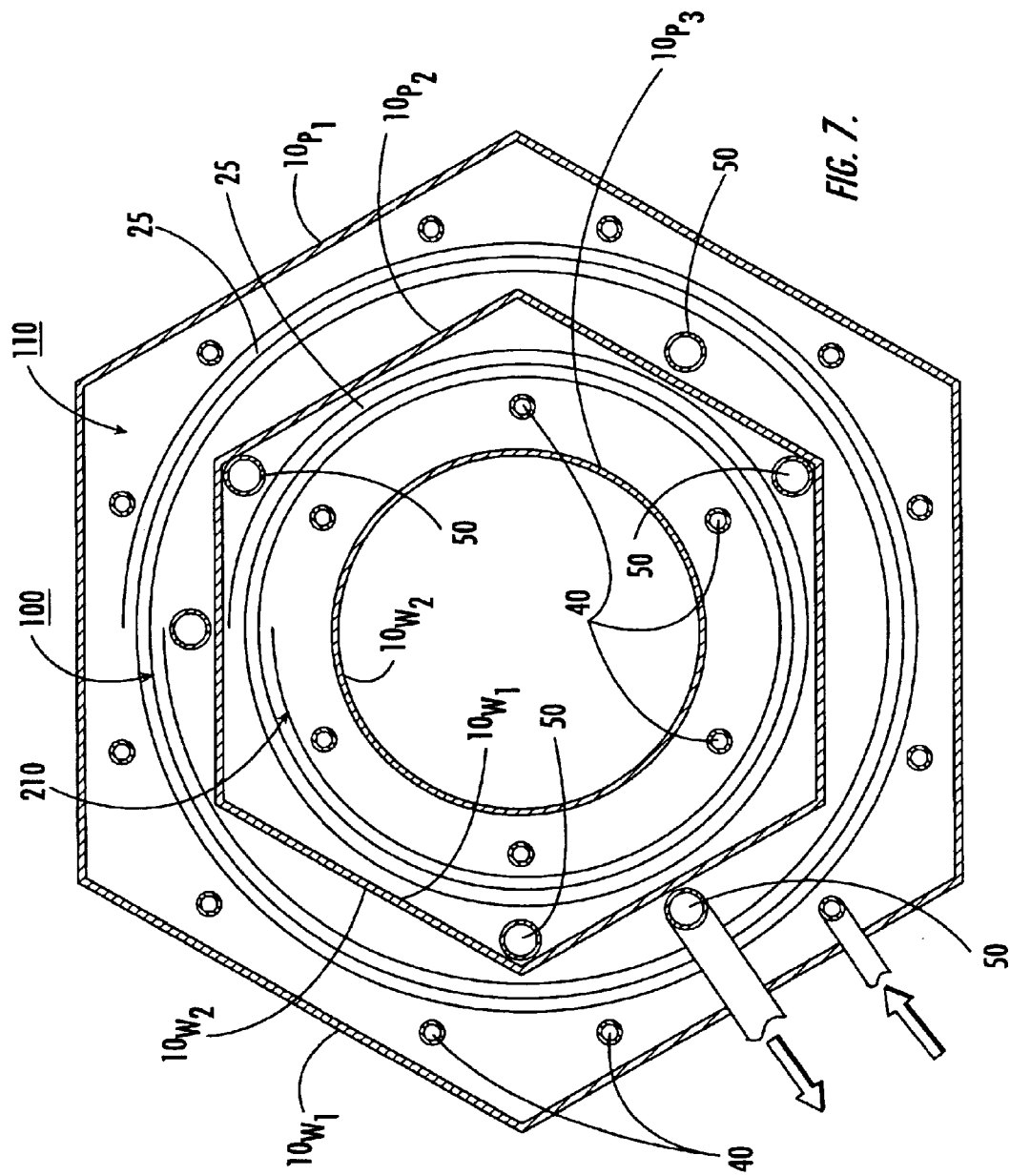
FIG. 7 is a cutaway top view of a tier of an alternate embodiment of a food processor with a nested configuration according to the present invention.
Figure 14B:
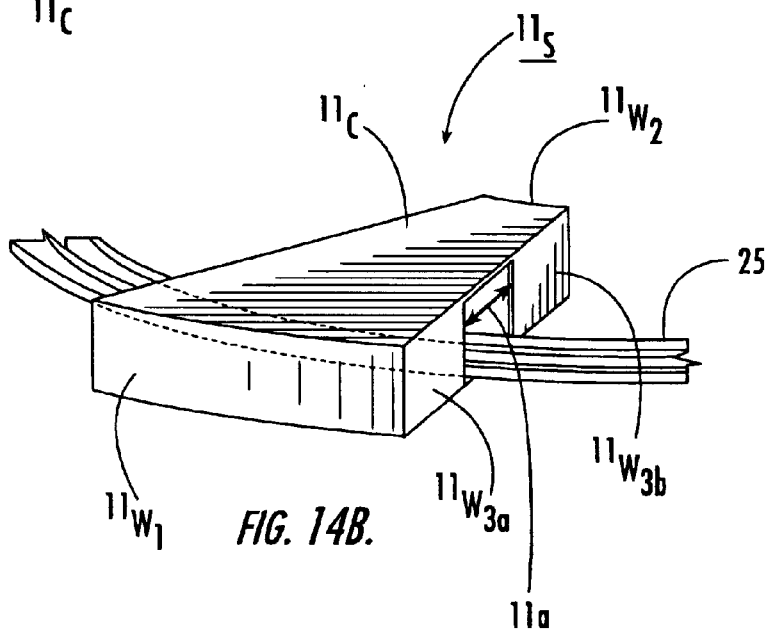
FIG. 14B is a perspective view of a portion of the segmented region of the tier shown in FIG. 14A.

FIG. 7 illustrates a nested 100 configuration, where an outer processor 110 is configured to surround or encase at least one inner processor 210. Each of the processors (which may comprise ovens) 110, 210 can have separate enclosures and/or sidewalls or may share one of the sidewalls. That is, the central perimeter wall 100$p_2$ can define the inner wall 100$w_2$ of the outer oven 110 and the outer wall 100$w_1$ of the inner oven 210. In certain embodiments, each of the processors 110, 210 can be separately insulated and regulated for desired operating environments (to provide the desired physical treatments such as selected fluids or gas mixtures, moisture, humidity, air velocity, temperature, chemicals, additives, ingredients, and the like). In addition, each tier or zone (a plurality of selected tiers) can be configured to have an individually controlled environment. In addition, or alternatively, as shown in FIGS. 14A and 14B, portions of one or more tiers can also be segmented. Its from other portions of the respective tier 11 so as to have its own controllable processing environment.

As shown in FIG. 7, each processor 110, 210 includes its own series of dispersed inlet and outlet ports 40, 50. As shown, the outer perimeter of each processor is hexagonal with the inner perimeter being circular. However, in other embodiments, circular, annular, rectangular, oval, square or other desired shapes can also be used. See U.S. patent application Ser. No. 09/888,925 to Shefet et al. for additional description of nested ovens or processors, conveyor configurations, and tiers, the contents of which are hereby incorporated by reference as if recited in full herein.

Figure 8B:
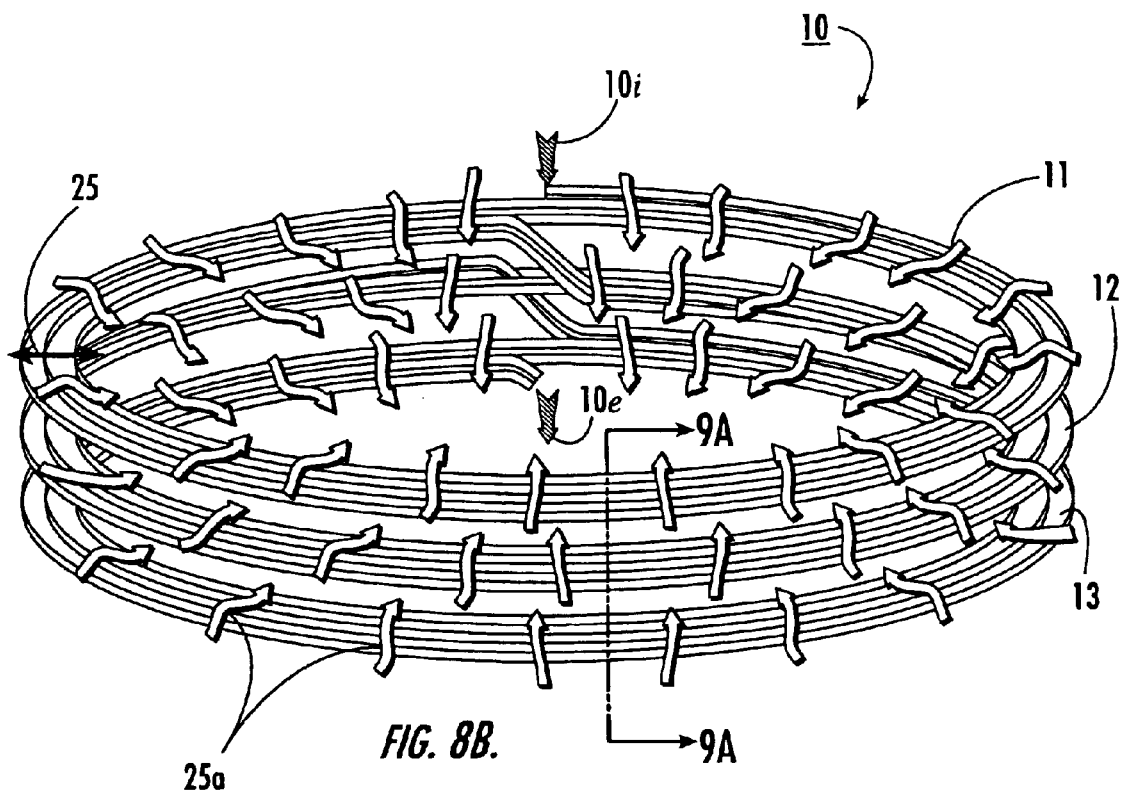
FIG. 8B is a schematic perspective view of a multiple vertically stacked tier configuration with an alternate exemplary forced gas and/or air distribution pattern according to embodiments of the present invention.

FIG. 8A is a schematic illustration of flow distribution about a plurality of tiers, the flow being represented by the arrows showing the fluid, typically gas, such as air, distributed and primarily moving in a direction that takes it across the product on each tier (traveling from an inner portion to an outer portion of the processor over the track 25 in each level or tier) as the product moves from the inlet 10i to the outlet 10e of the processor 10. FIG. 8B illustrates the reverse configuration with the gas, such as air, distributed and primarily moving in a direction that takes it across the product on each tier (traveling from an outer portion to an inner portion of the processor over the track 25 in each level or tier) as the product moves from the inlet 10$i$ to the outlet 10$e$ of the processor 10

FIG. 9A is a section view taken along the lines shown in FIGS. 8A and 8B (although the flow direction indicated by the arrows corresponds to the embodiment shown in FIG. 8A) and illustrates that, in certain embodiments, the track 25 in one or more tiers can define multiple side-by-side lanes $175_1$, $175_2$, $175_3$, $175_4$, $175_5$, $175_6$ of food 125 traffic. The thermally processed air 25$a$ is directed to travel between each tier and across the food 125 located in each lane $175_1$–$175n$.

FIG. 9B is a section view similar to FIG. 9A, but illustrates a different multi-track configuration from that shown in FIG. 9A. As shown, in certain embodiments, the track 25 in one or more tiers can define multiple side-by-side lanes $175_1$, $175_2$, $175_3$, $175_4$, $175_5$, $175_6$ of food 125 traffic with a gap space 25$g$ between floor support members (such as spaced apart rods) that provide the track. The thermally processed air 25$a$ is again directed to travel between each tier and across the food 125 located in each lane $175_1$–$175n$. Descriptions of additional gap-spaced flooring is described in co-pending U.S. Provisional Patent Application Ser. No. 60/354,097 filed Feb. 4, 2002, the contents of which are hereby incorporated by reference as if recited in full herein.

Figure 10:
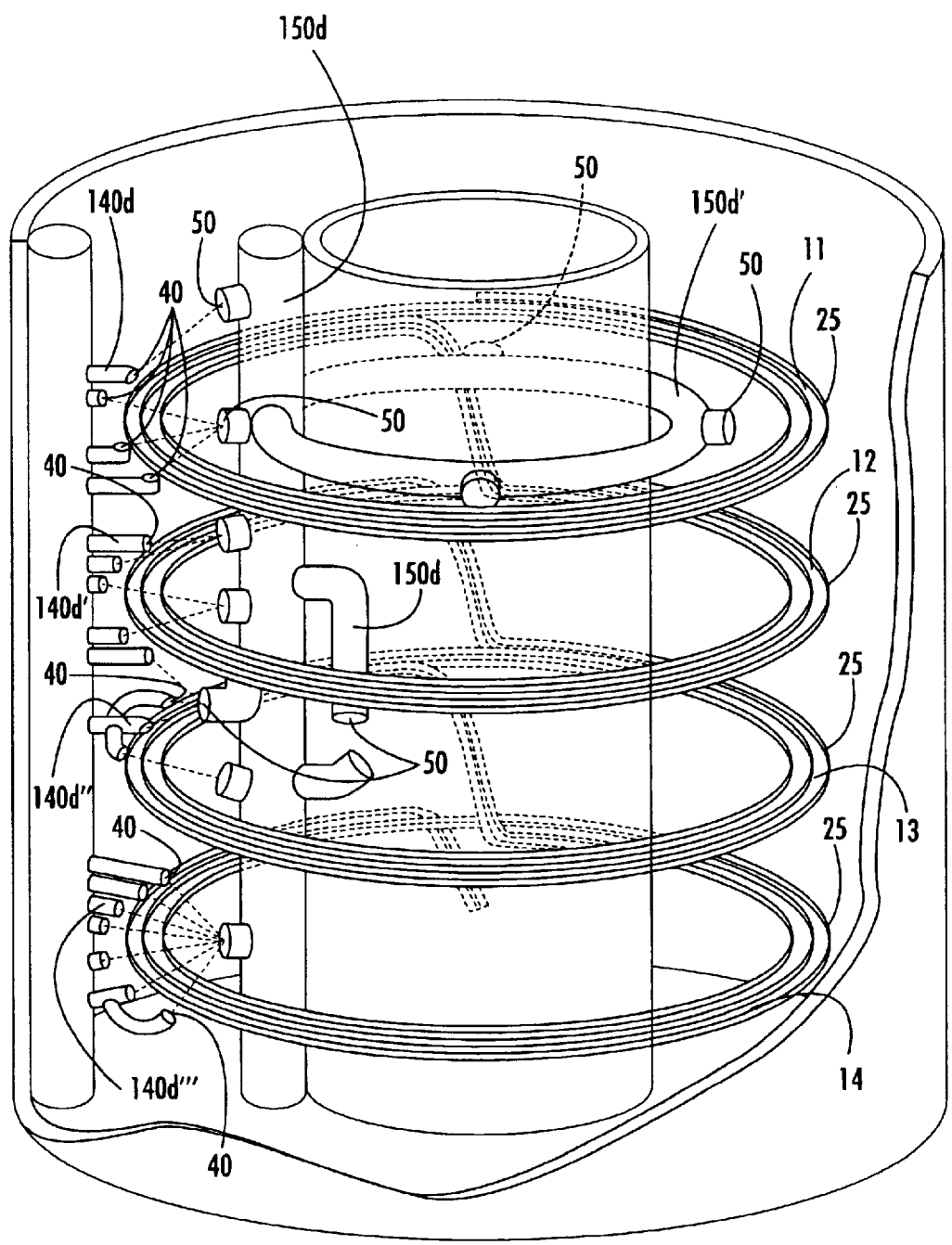
FIG. 10 is a partial cutaway view of a vertically oriented multiple-tier configuration product travel pathway with each tier having a different associated exemplary manifold or duct work arrangement for providing the desired forced gas/air flow pattern(s) according to embodiments of the present invention.

FIG. 10 is a schematic illustration of a perspective view of a portion of a processor according to certain embodiments of the present invention. As shown, at least one upwardly extending primary inlet duct 140$d$ is positioned about a first side of the track 25 in each tier 11–14. Various configurations of secondary ducts 140$d$ may be used to position the ports 40 as desired while providing the fluid communication with the exogenous supply of fluid, air or gas that is to be introduced via the inlet ports 40. For example, tier 11 illustrates a first embodiment where inlet ports 40 are positioned at vertical heights that are both above and below the track 25, all via secondary ducting 140$d$ that extends from the primary duct 40. Tier 12 illustrates a plurality of secondary ducts 140$d'$ with laterally extending portions can be used, each may have a different length and or size as desired, and all may be positioned about the same vertical height. Tier 13 illustrates that a manifold of ducts 140$d''$ can be used to distribute the fluid, gas, and/or air through inlet ports 40 as desired. Tier 14 is employs secondary ducts 140$d'''$ that are circumferentially dispersed about the track 25.

FIG. 10 also illustrates the use of at least one primary discharge duct 50$d$ and associated secondary ducting 150$d$ or port placement 50 that influences the fluid or gas distribution. Some of the discharge ducting is arranged so that ports 50 are located both above and below the track 25 as shown in tier 12. In this manner, the discharge ports 50 may influence fluid or gas flow (receive discharged gas or air from) two or more adjacent tiers. The arrangement in tier 11 provides two vertically spaced apart locations for discharge ports 50, one position being substantially level or just above the surface of the track 25 and another a distance above the track. Used with inlet ports 40 that are positioned lower than the track 25 may provide an increased distribution or increased gas or air flow or current over the food (as heated gas/air has a natural tendency to rise) or when used with lower tiers, may promote turbulent mixing of the gas/air resulting in better distribution and/or more uniform temperatures across the width of the track 25. Exemplary portions of flow patterns are shown in FIG. 10 about a portion of each tier 11–14. Discharge manifolds 150$d'$ such as that shown for tier 11 or other ducting and/or manifold arrangements can also be used as desired for the application. Further, although the ports 40, 50 are illustrated as oriented to output/intake in the direction of the track, they may be turned to face away from the track as the pressure differential will still act to move the gas/air across the track.

Additional quantities of upwardly extending primary ducts 40$d$, 50$d$ may also be used as desired to position the desired number of air inlet and exhaust ports 40, 50 in the desired locations about the track 25 as desired. They may be clustered together or spaced apart about the track 25. In addition, certain regions, zones or tiers may be configured to be substantially enclosed, relative to the other adjacent spaces, so as to be able to independently provide different climates or processing conditions. As such, ceilings, floors, baffles, or the like may be positioned at certain locations within the processor 10 (not shown).

Figure 11A:
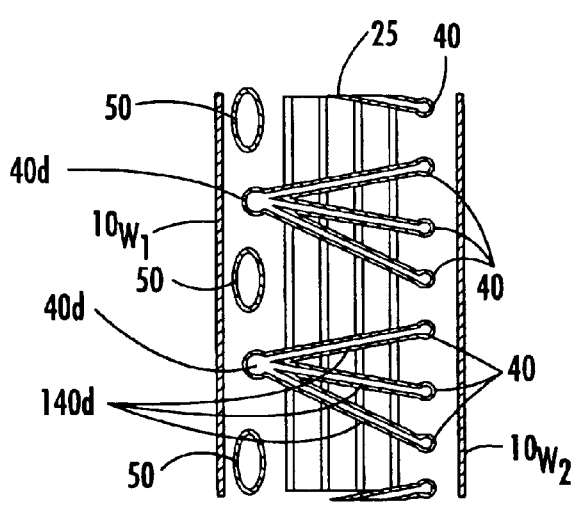
FIG. 11A is a top view of a portion of a food travel pathway similar to that shown in FIG. 1, illustrating a system employing primary ducts located on a common region of the food processor unit and intake and outlet/exhaust ports or openings still positioned across from each other to provide forced gas/air distribution systems according to embodiments of the present invention.
Figure 11B:
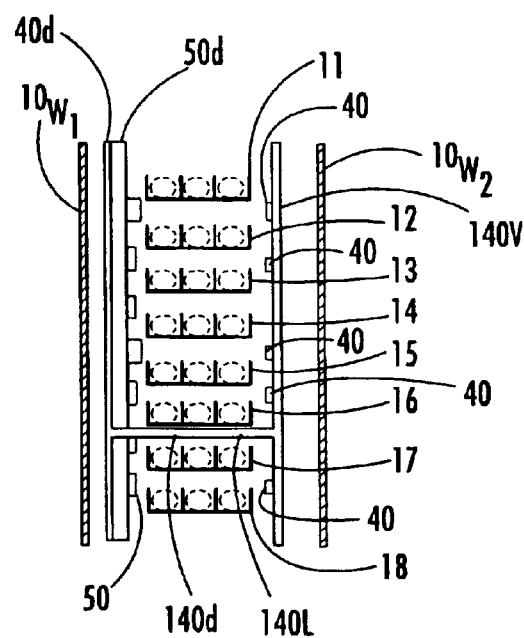
FIG. 11B is a side view of the configuration shown in FIG. 11A according to embodiments of the present invention.

FIGS. 11A and 11B illustrate yet another embodiment of a forced flow distribution system. As shown in FIG. 11B, the primary exhaust and inlet ducts 50$d$, 40$d$, respectively, are located on the same side of the track 25. However, as shown in FIG. 11A, the exhaust ports 50 are located on the same side of the track 25 as the primary ducts 40$d$, 50$d$, and the inlet ports 40 are located on the opposing side thereof. This distribution can be provided in a number of ways. As shown in FIG. 11A, a series of secondary ducts 140$d$ have arms that are in fluid communication with the primary duct 40$d$ and span the track 25 to position the ports 40 on the opposing side of the track 25 a lateral distance away from the primary duct 40$d$. FIG. 11B shows that the secondary ducts 140$d$ may include both a lateral segment 140L and a vertical segment 140V configured to position the inlet ports 40 proximate each tier 11–18. A similar duct arrangement can be used to position the exhaust system in its desired locations.

As is also shown in FIG. 11A, there are a greater number of spaced apart inlet ports 40 than the opposing exhaust ports 50. In addition, the opening or cross-sectional area of the inlet ports are smaller than the exhaust ports 50. As discussed above, in particular embodiments, the cumulative area of the exhaust ports in certain regions, tiers, or in the entire processor, is substantially equal to or greater than the corresponding cumulative cross-section or opening sizes of the inlet ports 40. Also shown in FIG. 11A, all exhaust ports 50 and/or all inlet ports 40, in a particular tier or zone, may be arranged to be substantially aligned so as to be located at the same vertical distance and equally spaced about a portion of the track (or the entire length of the tier) such that the inlet ports 40 are on one side of the track 25 (where the food resides and is moved during operation) and the outlet ports are on the other side of the track 25.

Figure 12A:
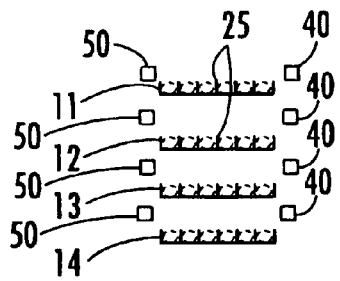
FIGS. 12A–12D illustrate aligned and offset arrangements of inlet and outlet/exhaust ports according to embodiments of the present invention.
Figure 12B:
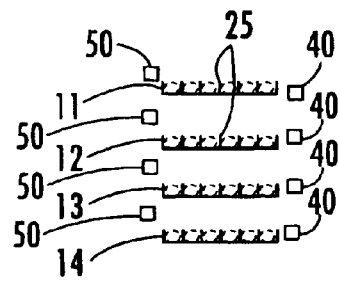
Figure 12C:
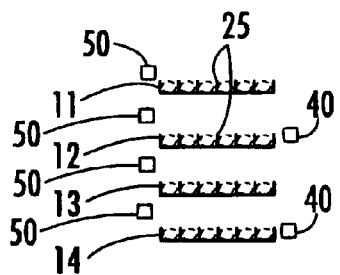
Figure 12D:
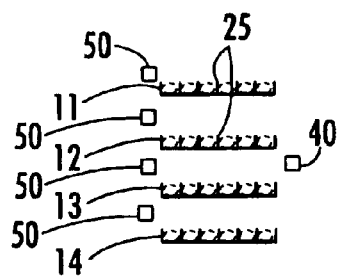

FIGS. 12A–12D illustrate that, for each or selected tiers, the inlet ports 40 and exhaust ports 50 may be configured at the same or different vertical heights. FIG. 12A illustrates that for each tier 11–14, the inlet ports 40 and exhaust ports 50 are located at the substantially the same vertical location. FIG. 12B illustrates that, for each tier 11–14, the inlet ports 40 are located below the corresponding exhaust ports 50. FIG. 12C illustrates that the inlet ports are located at a lesser number of vertical heights relative to the exhaust ports, such as proximate ever other tier 12, 14, while the exhaust ports may be located proximate to each tier 11–14. FIG. 12D illustrates that a single or centrally located array of inlet ports may be disposed in the processor with exhaust ports located proximate each tier 11–14. As noted above, the position of the inlet ports 40 and exhaust ports 50 relative to the side of the track 25 they are illustrated on can be reversed.

Figure 13A:
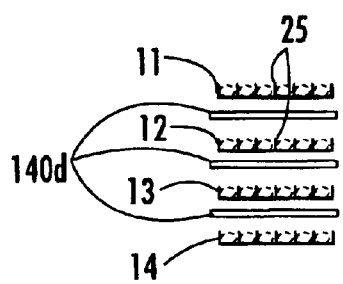
FIGS. 13A–13D illustrate examples of secondary ducts to distribute the desired gas/airflow distribution that are in fluid communication with a main duct that can be positioned on a common region or on opposing sides of the product and/or of the enclosure according to embodiments of the present invention.
Figure 13B:
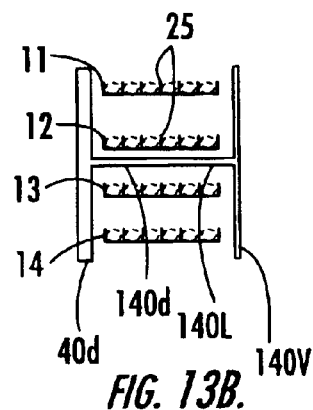
Figure 13C:
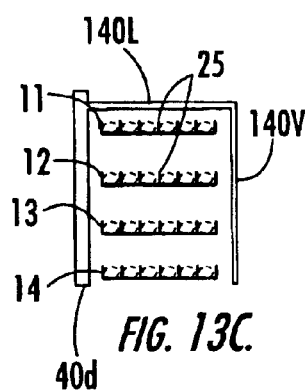
Figure 13D:
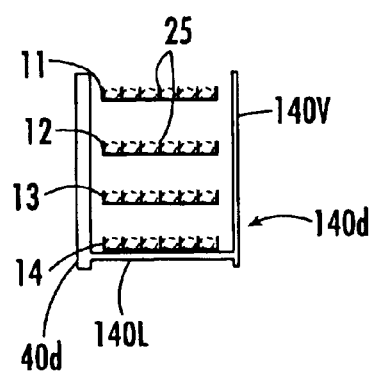

FIGS. 13A–13D illustrate other ducting embodiments. As noted previously, the primary ducts 40d, 50d may be positioned on the same side of the track 25, or opposing sides of the track (either in or outside the walls of the oven). Thus, in certain embodiments, secondary ducts can be used to locate or position the ports 40, 50 in the desired locations about one or more tiers 11–14. For clarity, the primary ducts in FIGS. 13A–13D have been labeled as the inlet ducts 40d, 140d, but the same configurations can be used for the exhaust ducts 50d, 150d to distribute the exhaust system. FIG. 13A illustrates that each tier may employ a secondary laterally extending duct 140d. FIGS. 13B–13D shows examples of secondary ducting that may be in fluid communication with the primary duct 40d. That is, the ducting can include a secondary duct system 140d that includes vertical and horizontal or lateral components, 140V, 140L that can be configured in various manners to extend between above, or below selected tiers 11–14. Various combinations of those shown as well as other configurations may also be employed.

Embodiments of the invention can provide a multi-zone (tier) processor with each zone having similar or different thermal gradients (the thermal gradient measured as temperature versus distance from a wall of the processor to an opposing wall and/or from a position proximate a first side of the track to the other side of the track across the food travel lane(s)). The thermal gradients may be such that the air temperature proximate the product across the width of the lane is substantially constant or uniform within a particular space so that food is relatively consistently exposed to a thermal treatment as it travels through a tier, segment of a tier, zone, and/or the entire processor.

FIG. 14A illustrates a top view of one embodiment of a tier 11. As shown, the tier 11 may include a segmented portion 11s that is substantially physically isolated from the other portion of the same tier 11. As shown by the hatched lines representing the ceiling 11c in the top view of the segment 11s, the segment 11s can be partitioned from the other portion of the tier so that it's environment is separately individually controllable. FIG. 14B illustrates that the segment 11s includes upstanding walls $11w_1, 11w_2, 11w_3, 11w_4$ that, with the ceiling 11c, substantially encloses the corresponding portion or length of track 25. The forward portion of the wall $11w_3$ can include two side components $11w_{3a}$, $11w_{3b}$ with a gap space 11a overlying the track 25 that allows the track (and/or food thereon) to move therein.

FIG. 14A also illustrates that the present invention contemplates the use of exhaust ports 50 on the same side of the track as the inlet ports 40 and/or vice versa, inlet ports 40 on the same side as the outlet ports 50 (in segmented or non-segmented portions of the tier(s)). That is, a minor number of such opposite function ports positioned on the other side of the track from the corresponding major portion of like function, may be arranged and configured so as to not stop and/or unduly interfere with the desired cross-flow pattern of the fluid, gas and/or air in the processor and may be used in certain embodiments.

Figure 15:
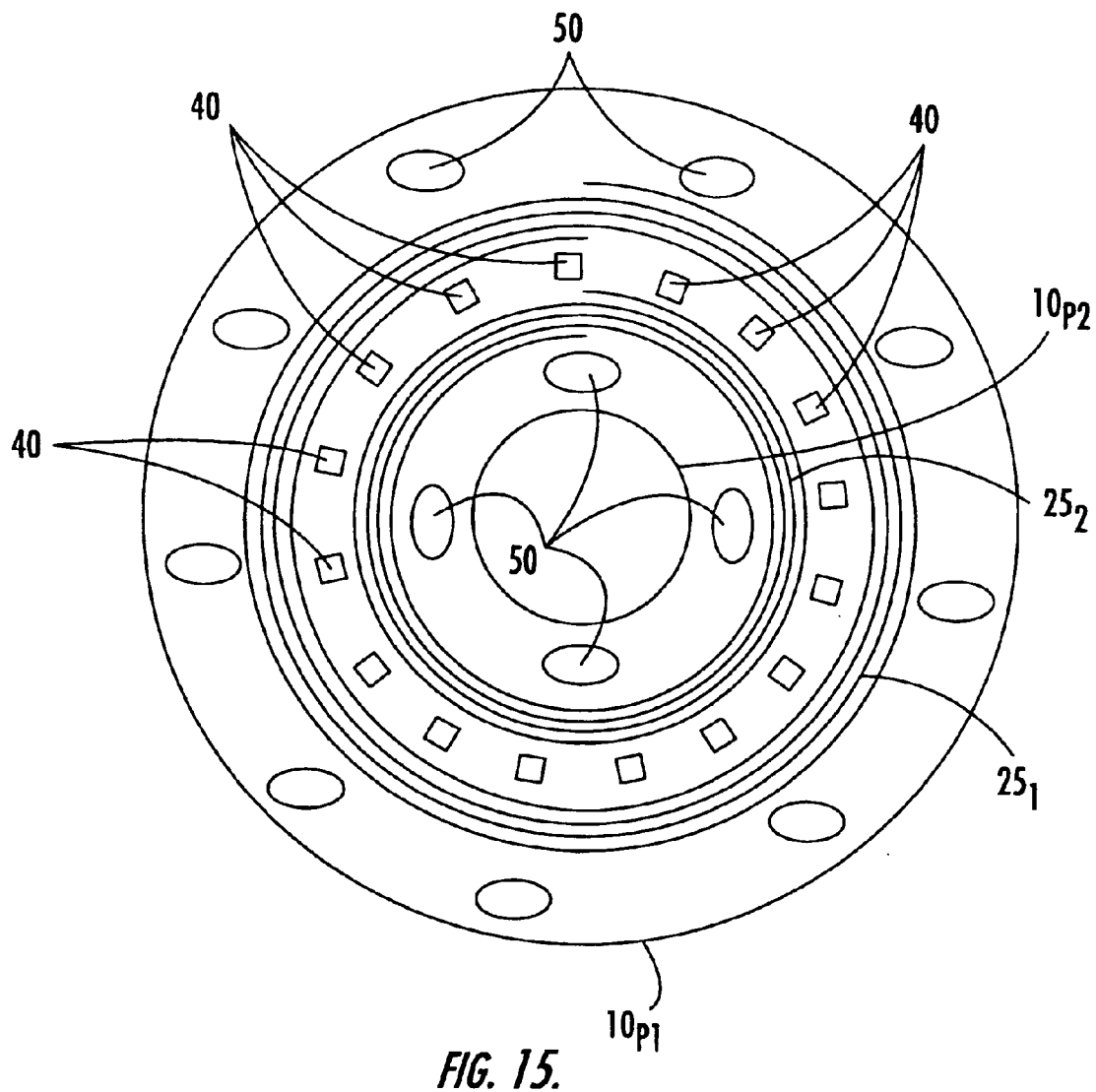
FIG. 15 is a top schematic view of an alternate arrangement of tracks and inlet and outlet ports that may promote cross-flow of gas according to embodiments of the present invention.

FIG. 15 illustrates that the processor 10 may be configured with spaced apart tracks $25_1, 25_2$, (shown as two, but additional numbers of tracks can also be used) with at least one of inlet or outlet ports 40, 50, respectively, positioned intermediate thereof. As shown, a plurality of inlet ports 40 are circumferentially spaced apart about the space between the tracks $25_1, 25_2$ and exhaust ports 50 are located both on the outer portion of the first track $25_1$ and the inner portion of the second track $25_2$. The ports 40, 50 can be configured in reverse, with the exhaust ports located between the tracks $25_1, 25_2$ and the inlet ports 40 located both on the outer portion of the first track $25_1$ and the inner portion of the second track $25_2$. Portions of either or both of the first or second track $25_1, 25_2$ may be segmented as described for FIGS. 14A and 14B.

Referring to FIGS. 2 and 6A, where used, the speed of the conveyor(s) used to form one or more of the moving floors for the travel lanes 59, 60 forming the track 25 including those described above, can be set to match the desired residence time according to the time desired in each tier. In certain embodiments, the oven can be configured with a height of between about 20–40 feet with a length of between about 60–400 feet and a width of between about 20–100 feet running an elongated meat product at about 5–6.5 fps (feet per second). Of course, the processors or ovens of the present invention are not limited thereto, as any desired profile (height×width×depth) can be used depending on the floor space and ceiling limitations and the capacity or processing (time) requirements. In certain embodiments, the food processor 10 can include one or more zones that form an oven and can be configured to throughput at least about 5,000–23,000 feet per hour of a food item, typically an elongated meat product, during a desired period.

The conveyors on each tier or between tiers can be operated or adjusted so as to run at the same or different conveyor speeds. In certain embodiments, the processor 10 can be configured to concurrently process a plurality of elongated strands (such as, but not limited to, about 4–50 strands). In certain embodiments, about seven to fourteen separate strands of elongated continuous food product can be introduced into the food inlet and onto the upper tier. In so doing, the surface of the lanes 11 can include holding grooves or guides to help position the strands side-by-side on the respective travel paths in each tier. As such, each travel lane shown in FIGS. 2, 5, 8, 9A, 9B, 14, 14 can hold a discrete strand of food product or the strand may have a length such that it covers more than one lane during processing which travel concurrently serially about each of the lanes to make the desired number of revolutions at each tier.

In certain embodiments, the processor 10 can be configured with a plurality of vertically stacked layers and an elongated meat product or strand can be directed to travel serially over each of the layers at a desired rate. For example, for food dwelling at about 1 minute per layer, and a 60-layer configuration, the food will have a cumulative processor dwelling time of about 1 hour.

In certain embodiments, the processor can be configured to throughput of at least about 5,000–23,000 feet per hour of a food item, typically an elongated meat product.

In certain embodiments, one or a plurality of separate strands of elongated continuous food product can be introduced into the food inlet and onto the upper tier. In so doing, the lanes shown as two perimeter paths 59, 60 in FIG. 2, can include holding grooves or guides to help position the strands side-by-side on the respective travel paths in each tier. In addition, a plurality of food diverters can be positioned in the transfer zone 50z to divert the strands to the other adjacent travel path. As such, each single food line or travel path shown in FIGS. 1–15 can represent a plurality of side-by-side products, which travel concurrently serially about each of the perimeter paths to make the desired number of revolutions at each tier.

It is noted that the present invention also contemplates that single tier embodiments can also be employed and/or stacked tiers 10 can be configured as any suitable or desired combinations of the tier configurations, the conveyor configurations and/or travel paths described herein.

The travel pathway may include channels, grooves, or other configurations that are configured to hold food thereon. The travel pathway be configured as substantially planar, or non-planar, they may be substantially open support surfaces or enclosed (partially, or totally) channels, the food may be processed as it directly resides on the floor of the travel pathway or the food may be packaged or put into transportable containers. The present invention contemplates that any number of suitable travel pathways, support configurations, and/or advancing mechanisms can be used to carry out operations associated with the present invention.

In certain embodiments, a container can be used to hold the food therein during its progression through the processor. For example, an elongated food snack item that can be introduced in a liquid or gelatinous form (yogurt, freezable edible confections) and processed in a container (a flexible package or closed or open rigid container). The product may be processed so as to be frozen as a result of its travel in the processor. The packaging or containers may be strung or attached together in desired lengths.

The forced air systems can be used with any desired processing system, including any desired heating or cooking configuration such as, but not limited to, RF, microwave, light energy (infrared, solar and the like), irradiation, and the like.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for treating food traveling through a food processor, comprising:
   moving at least one food item over a predetermined travel path in a food processor having a food travel pathway comprising a moving floor and upwardly extending first and second sidewalls located on opposing sides thereof, the travel pathway having corresponding first and second side portions;
   introducing exogenous fluid into the food processor from a plurality of inlet ports positioned proximate the first side position of the travel pathway during the moving step to thereby treat the food item;
   exhausting fluid from the food processor from a plurality of exhaust ports positioned proximate the second side portion of the travel pathway; and
   directing the exogenous fluid to travel from the first side portion to the second side portion over the food held on the food item travel pathway.

2. A method according to claim 1, wherein the food processor includes a plurality of vertically stacked tiers each having a portion of the food travel path thereon, each of the vertically stacked tiers being longitudinally spaced apart a desired distance from the other tiers, and wherein the moving step is carried out by advancing the food item along the travel pathway so that it travels successively over a plurality of different tiers.

3. A method according to claim 2, wherein the fluid comprises gas as a major constituent, and wherein the moving step is carried out such that the food item travels substantially continuously greater than one revolution in a first tier before it moves to the next selected tier.

4. A method according to claim 3, wherein the exogenous fluid comprises thermally treated air in at least one tier, and wherein each tier is configured with a plurality of travel perimeter paths thereon, each of the travel perimeter paths forming a serial portion of the predetermined travel path so as to direct the at least one food item to travel a predetermined distance about a major portion of a first perimeter path and then alter its travel path on the respective tier to travel a predetermined distance about a major portion of a second perimeter path, wherein the second perimeter path is different from the first perimeter path.

5. A method according to claim 4, wherein the fist perimeter path surrounds a major portion of the second perimeter path.

6. A method according to claim 5, wherein the second perimeter path surrounds a major portion of the first perimeter path.

7. A method according to claim 5, wherein the first and second perimeter paths are spaced in side-by-side alignment.

8. A method according to claim 5, wherein the first and second perimeter paths are substantially coplanar when viewed from the side.

9. A method according to claim 2, wherein the predetermined travel path includes a plurality of transfer regions, a respective one for each tier, which allows the at least one food item to move to the next selected tier.

10. A method according to claim 2, wherein each tier defines a portion of the predetermined travel path, and wherein each tier comprises at least one conveyor that defines at least a portion of the moving floor.

11. A method according to claim 9, wherein the plurality of tiers have a substantially circular predetermined travel path.

12. A method according to claim 2, further comprising alternating the lateral travel pattern of the at least one food item as it moves between adjacent tiers such that the food item travels from an inside to an outside perimeter on a first tier and then an outside to an inside perimeter on an adjacent tier.

13. A method according to claim 3, wherein each tier has a desired air temperature associated therewith, and wherein the moving step employs at least one conveyor on each tier and the at least one food item is exposed to the tier temperature for a time corresponding to the conveyor speed as it travels through that tier.

14. A method according to claim 1, wherein the at least one food item is an elongated food item.

15. A method according to claim 1, wherein the at least one food item is an elongated meat product having a length of at least about 20 feet.

16. A method according to claim 1, wherein the fluid is a gas mixture, and the method further comprises the steps of:
   arranging the plurality of inlet ports so that they are spatially horizontally spaced apart about the first side portion of the food travel path; and
   arranging the plurality of exhaust ports so that they are spatially horizontally spaced apart about the second side portion of the food travel path.

17. A method according to claim 16, further comprising configuring the exhaust ports, in number and/or size, so that they present a cumulative cross-sectional area that is substantially equal to or greater than that of the cumulative cross-sectional area of the inlet ports.

18. A method according to claim 16, further comprising configuring the exhaust ports so that they present a cumulative cross-sectional area that is less than that of the cumulative cross-sectional area of the inlet ports;
monitoring the internal pressure in the food processor for predetermined pressure levels; and
controllably discharging exhaust gas through a pressure relief valve at selected detected pressure conditions responsive to the monitoring step.

19. A method according to claim 16, wherein the number of inlet ports are greater than the number of exhaust ports.

20. A method according to claim 19, wherein the exhaust posts have a larger cross-sectional area than the inlet ports.

21. A method according to claim 2, wherein the fluid comprises a gas mixture, said method further comprising positioning primary upwardly extending inlet and exhaust ducts in the food processor to distribute the exogenous supply of gas mixture proximate each tier.

22. A method according to claim 21, further comprising positioning secondary inlet ducts that comprise laterally extending arms in fluid communication with the primary duct about at least one tier to facilitate air distribution.

23. A method according to claim 21, further comprising positioning secondary exhaust ducts that comprise laterally extending arms in fluid communication with the primary duct about at least one tier to facilitate gas distribution.

24. A method according to claim 21, wherein the primary inlet duct and the primary exhaust duct are disposed on the same side of the food travel path and gas is directed to exhaust from the other side of the food travel path.

25. A method according to claim 21, wherein the primary inlet duct and the primary exhaust duct are disposed on the same side of the food travel path and gas is directed to be introduced to the food from the other side of the food travel path.

26. A method according to claim 23, wherein the primary inlet duct and the primary exhaust duct are disposed on opposing sides of the food travel path.

27. A method according to claim 2, wherein the exogenous fluid comprises thermally treated air, and wherein the food processor comprises an inner column of tiers and an outer column of tiers, each column defining a separate travel path for a desired at least one food item, and wherein the outlet tier is configured to encase the inner tier so that each of the inner and outer column of tiers has its own first and second upwardly extending sidewalls and food travel path, and wherein the steps of moving the food, introducing the exogenous fluid, exhausting, directing the gas, and treating the food can be selectively carried out in each of the inner and outer columns of tiers.

28. A method according to claim 27, wherein different food items are concurrently directed to travel independently through the inner and outer column of tiers.

29. A method according to claim 27, wherein the inner column of tiers comprises an inner oven and the outer column of tiers comprises an outer oven, and wherein each of the inner and outer column of tiers at each tier level are separately regulated for desired operating environments by the steps of introducing and exhausting.

30. A method according to claim 28, wherein the at least one food item is an elongated meat product having a length which extends over a major portion of the predetermined travel path.

31. A food processing apparatus with forced gas distribution systems comprising:
a housing defining an enclosure and having a food inlet and a food outlet; and
a plurality of stacked tiers residing in said housing, one or more tiers defining a treatment zone within the food processing apparatus, each of said tiers comprising a moving floor that moves the food along its desired travel path over a primary surface of a respective tier; and
a forced gas distribution system in fluid communication with the stacked tiers, the system comprising:
a first plurality of inlet ports positioned on a first side portion of the food travel path proximate each tier;
a second plurality of exhaust ports positioned on a second side portion of the food travel path across from the plurality of inlet ports proximate each tier; and
an exogenous supply of gas operably associated with the inlet ports,
wherein, in operation, the gas flows over the food in each tier as the food is substantially moving through a treatment zone.

32. A system according to claim 31, wherein the exogenous gas comprises air, and wherein the tiers are configured to substantially continuously move the food, and wherein the moving floor on each tier includes at least one conveyor.

33. A system according to claim 31, wherein the second plurality of exhaust ports is less than the first plurality of inlet ports.

34. A system according to claim 31, wherein a major portion of the plurality of inlet ports are configured and held in the food processor about the plurality of the stacked tiers so that they are spatially horizontally spaced apart about the first side portion of the food travel path, and wherein a major portion of the plurality of exhaust ports are configured and held in the food processor so that they are spatially horizontally spaced apart about the second side portion of the food travel path.

35. A system according to claim 31, wherein the exhaust ports are configured so that they have a cumulative cross-sectional area that is greater than that of the cumulative cross-sectional area of the inlet ports.

36. A system according to claim 31, wherein said forced gas distribution system comprising a pressure relief valve that is configured to release gas from the food processor upon the detection of elevated pressure levels, and wherein the exhaust ports are configured so that they present a cumulative cross-sectional area that is less than that of the cumulative cross-sectional area of the inlet ports.

37. A system according to claim 31, wherein the exhaust ports are configured so that they have a cumulative cross-sectional area that is substantially equal to that of the cumulative cross-sectional area of the inlet ports.

38. A system according to claim 31, further comprising at least one primary upwardly extending inlet duct and at least one primary upwardly extending exhaust duct held within the food processor in fluid communication with the inlet and exhaust ports, respectively, so as to distribute the exogenous gas proximate each tier.

39. A system according to claim 38, further comprising at least one secondary inlet duct located at least about selected ones of the tiers, the secondary duct comprising laterally extending arms and being in fluid communication with a selected one of the primary ducts to facilitate gas distribution.

40. A system according to claim 38, wherein the exogenous gas comprises thermally treated air, said system further comprising a plurality of secondary exhaust ducts in fluid communication with the primary exhaust duct, and a plurality of secondary inlet ducts in fluid communication with the primary inlet duct, wherein at least one of the secondary ducts comprises laterally extending arms that span the distance associated with the width of the travel path about at least one tier to thereby facilitate air distribution.

41. A system according to claim 40, wherein the primary inlet duct and the primary exhaust duct are disposed on the same side of the food travel path, and a plurality of secondary exhaust ducts have laterally extending arms so that, in operation, air is directed to enter the exhaust from the side of the food travel path opposite the primary exhaust duct.

42. A system according to claim 40, wherein the primary inlet duct and the primary exhaust duct are located on the same side of the food travel path, and a plurality of secondary inlet ducts have laterally extending arms so that, in operation, air is directed to flow across the food starting from the side of the food travel path opposite the primary inlet duct.

43. A system according to claim 38, wherein the primary inlet duct and the primary exhaust duct are disposed on opposing sides of the food travel path.

44. A system according to claim 38, wherein each tier includes a portion of the food travel path, and wherein the portion of the travel path is configured to define a substantially circular track.

45. A system according to claim 31, wherein the system is configured to process an elongated food product having a length of at least about 20 feet therein.

46. A system according to claim 31, wherein the system is configured to process a meat product.

47. A system according to claim 31, wherein the system is configured to process a vegetable product.

48. A system according to claim 31, wherein the system is configured to process a fruit product.

49. A system according to claim 31, wherein the system is configured to process a dough, bread, or baked product.

50. A system according to claim 31, wherein the system is configured to process a dairy product.

51. A system according to claim 31, wherein the system is configured to process a product in a container having a gelatinous or liquid form that transitions to a solid or semi-solid form in the processor as a result of the treatment administered therein.

52. A system according to claim 31, wherein the system is configured to process at least two of a meat product, a vegetable product, a fruit product, a dairy product, a confection product, a dough product.

53. An apparatus according to claim 44, wherein the moving floors comprise at least one conveyor that is configured to direct the food product to travel greater than about 1.25 revolutions about a respective tier before moving to the next desired tier.

54. An apparatus according to claim 38, wherein at least one tier has a segmented portion that is substantially fluidly isolated from the remaining portion of that tier so that, during operation, a different processing environment can be selectably introduced therein relative to the remaining portion of that tier.

55. A nested food processing apparatus, comprising:
(a) an outer processor having spaced apart inner and outer walls defining an enclosure therebetween and a food inlet and food outlet, said outer processor comprising:
a plurality of vertically stacked tiers held within the enclosure;
at least one conveyor operably associated with each tier, the at least one conveyor being configured to move a food item about the tier such that the food item travels greater than one revolution in each tier;
transfer means operably associated with the tiers for directing the food item to travel to the next selected tier; and
a gas distribution system, comprising:
an exogenous supply of gas or gas mixture;
a first plurality of spaced apart inlet ports positioned in the processing apparatus proximate to each tier about a selected one of the inner or outer walls in fluid communication with the exogenous supply of gas or gas mixture;
a second plurality of spaced apart exhaust ports positioned in the processing apparatus proximate to each tier about a different one of the walls selected to locate the inlet ports, wherein the second plurality is less than the first plurality;
wherein the gad distribution system is configured to continuously distribute the gas or gas mixture while food item is moving through each tier; and
(b) an inner processor defining an enclosure having associated upwardly extending sidewalls and a food inlet and a food outlet, wherein said outer processor is configured to receive and surround said inner processor, wherein each of said inner and outer processors are configured to provide separately regulated operating environments, said inner processor comprising:
a plurality of vertically stacked tiers held within the inner processor enclosure;
at least one conveyor operably associated with each tier, the at least one conveyor being configured to move a food item about the tier such that the food item travels greater than one revolution in each tier;
transfer means operably associated with the at least one conveyor for directing the food item to travel to the next selected tier; and
a gas distribution system, comprising:
an exogenous supply of gas or gas mixture;
a first plurality of spaced apart inlet portions positioned in the processing apparatus proximate to each tier about a selected one of the sidewalls in fluid communication with the exogenous supply of gas or gas mixture;
a second plurality of spaced apart exhaust ports positioned in the processing apparatus proximate to each tier about a different one of the sidewalls selected to locate the inlet ports, wherein the second plurality is less than the first plurality;
wherein the gas distribution system is configured to continuously distribute the exogenous gas or gas mixture while food item is moving through each tier.

56. A nested oven according to claim 55, wherein the exogenous supply of gas or gas mixture comprises thermally treated air, wherein said inner and outer processors comprise portions that are ovens, wherein the processors are annularly shaped, and wherein the inner and outer ovens are coaxially aligned.

57. A nested oven according to claim 55, wherein said at least one conveyor of said inner and outer processors comprises a single conveyor configured to define multiple revolutions on at least one tier.

58. A food processing system having at least one food processing chamber for treating food, comprising:
means for moving food through a food processing chamber having a plurality of stacked tiers each providing at least one food travel lane, as the food is held on a food support surface;

means for directing exogenously introduced air into inlet ports disposed on a first side portion of the at least one food travel lane of the respective tiers and to exit from exhaust ports located on a second opposing side portion of the at least one food travel lane of the respective tiers so as to cause the air to flow across the food held on the food support surface inside the food processing chamber, at each tier while the food is moving in the chamber so that the air has major lateral flow direction as the air travels in the chamber from inlet ports to respective exhaust ports; and means for exhausting the air from the chamber while the food is moving in the chamber.

59. A system according to claim 58, wherein the system includes a plurality of exhaust ports having a cumulative cross-sectional area and a plurality of inlet ports having a cumulative cross-sectional area, the exhaust ports being configured in sufficient quantity and/or size so that the exhaust ports cumulative cross-sectional area is substantially equal to or greater than the cumulative cross-sectional area of the inlet ports.

60. A system according to claim 59, wherein the exhaust ports are configured so that they present a cumulative cross-sectional area that is less than that of cumulative cross-sectional area of the inlet ports, the system further comprising:

monitors for determining the internal pressure in the food processor; and means for controllably discharging exhaust gas through a pressure relief valve at selected detected pressure conditions responsive to the internal pressure sensed by the monitors.

61. A system according to claim 59, wherein the number of inlet ports are greater than the number of exhaust ports.

62. A system according to claim 59, wherein the exhaust ports have a larger cross-sectional area than the inlet ports.

63. A system according to claim 58, wherein the tiers have a plurality of side by side travel lanes, and wherein the system further comprises a plurality of elongate food items in the chamber.

64. A system according to claim 58, wherein for a respective tier, a plurality of inlet ports are positioned laterally spaced apart above the food travel lane on the first side portion of the at least one food travel lane and at least one corresponding exhaust port is positioned above the food travel lane on the second side portion of the at least one travel lane in fluid communication with the corresponding inlet ports.

65. A system according to claim 58, wherein for a respective tier, a plurality of inlet ports are positioned above the food travel lane on the first side portion of the at least one food travel lane and at least one corresponding exhaust port is positioned substantially level with the food travel lane and/or inlet ports on the second side portion of the at least one travel lane in fluid communication with the corresponding inlet ports.

66. A system according to claim 58, wherein for a respective tier, a plurality of inlet ports are positioned above the food travel lane on the first side portion of the at least one food travel lane and at least one corresponding exhaust port is positioned below the food travel lane on the second side portion of the at least one travel lane in fluid communication with the corresponding inlet ports.

67. A system according to claim 58, wherein an air distribution plenum is configured with vertically spaced apart inlet ports disposed proximate each tier level and an air exhaust plenum with vertically spaced apart exhaust ports proximate each tier level, and wherein, the at least one food travel lane is configured to substantially continuously advance along a predetermined travel path to generate air currents in the system.

68. A system according to claim 67, wherein at least one tier is configured so that at least one of the exhaust ports pulls air therein from a plurality of the different vertically spaced inlet ports from at least two adjacent tier levels.

69. A system according to claim 58, wherein for at least one tier level, a plurality of inlet ports are spaced apart about an outer perimeter of the at least one food travel lane on the first side portion thereof and a plurality of exhaust ports are spaced apart about an inner perimeter of the at least one food travel lane, wherein the tier level has fewer exhaust ports than inlet ports.

70. A system according to claim 58, wherein the at least one travel lane comprises a plurality of side by side travel lanes, and wherein, when viewed from the top, the inlet ports and exhaust ports are offset from each other across the food travel lanes.

* * * * *

UNITED STATES PATENT AND TRADEMARK OFFICE
CERTIFICATE OF CORRECTION

PATENT NO. : 6,713,107 B2
DATED : March 30, 2004
INVENTOR(S) : Shefet et al.

It is certified that error appears in the above-identified patent and that said Letters Patent is hereby corrected as shown below:

Column 19,
Line 58, should read as follows:
-- side portion of the travel pathway during the moving --

Column 24,
Line 18, should read as follows:
-- wherein the gas distribution system is configured to --

Signed and Sealed this

Twenty-third Day of November, 2004

JON W. DUDAS
*Director of the United States Patent and Trademark Office*